United States Patent
Guan et al.

(10) Patent No.: US 12,399,793 B2
(45) Date of Patent: Aug. 26, 2025

(54) ADAPTIVE WORD LINE STRESS FOR LEAK DETECTION IN NON-VOLATILE MEMORY

(71) Applicant: Sandisk Technologies, Inc., Milpitas, CA (US)

(72) Inventors: Troy Guan, Shanghai (CN); Liang Li, Shanghai (CN); Wendy Yu, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 188 days.

(21) Appl. No.: 18/346,362

(22) Filed: Jul. 3, 2023

(65) Prior Publication Data

US 2024/0403178 A1  Dec. 5, 2024

Related U.S. Application Data

(60) Provisional application No. 63/505,330, filed on May 31, 2023.

(51) Int. Cl.
*G06F 11/00* (2006.01)
*G06F 11/27* (2006.01)

(52) U.S. Cl.
CPC .................................. *G06F 11/27* (2013.01)

(58) Field of Classification Search
CPC .. G06F 11/27; G06F 11/0727; G06F 11/0754; G06F 11/24; G06F 11/3034; G06F 11/3058; G01R 31/3008; G01R 31/52
See application file for complete search history.

(56) References Cited

U.S. PATENT DOCUMENTS

| | | | |
|---|---|---|---|
| 8,432,732 B2 | 4/2013 | Li et al. | |
| 8,514,630 B2 | 8/2013 | Huynh et al. | |
| 9,443,610 B1* | 9/2016 | Pan | G11C 29/025 |
| 9,905,307 B1 | 2/2018 | Ghai et al. | |
| 10,008,276 B2 | 6/2018 | Huynh et al. | |
| 10,714,205 B1* | 7/2020 | Fang | G11C 29/025 |
| 11,309,035 B1* | 4/2022 | Li | G11C 16/08 |
| 11,404,138 B2 | 8/2022 | Lakshminarayana Addagalla et al. | |
| 2019/0006020 A1* | 1/2019 | Sundaresan | G11C 29/12005 |
| 2021/0304805 A1* | 9/2021 | Visconti | G11C 29/4401 |
| 2021/0398602 A1* | 12/2021 | Lakshminarayana Addagalla | G11C 16/0483 |
| 2023/0417841 A1* | 12/2023 | Aichriedler | G01R 31/52 |

\* cited by examiner

*Primary Examiner* — Joseph D Manoskey
(74) *Attorney, Agent, or Firm* — Pearl Cohen Zedek Latzer Baratz LLP

(57) ABSTRACT

In a word line leakage detection process in a NAND or other non-volatile memory device, a stress selected set of word lines have a high stress voltage applied while other parts of an array are biased to a low level. While stressing the memory array, the current drawn by the array is compared to a leakage detection current that increases in amplitude. For example, this can be done by mirroring the array current and comparing this with the current from a current source that increases in response to a digital input value and determining when it exceeds the mirror current, at which point the stress is discontinued. In addition to determining the amount of leakage, this approach results in low leakage word lines receiving less stress, while greater leakage result in greater amounts of stress being applied.

20 Claims, 21 Drawing Sheets

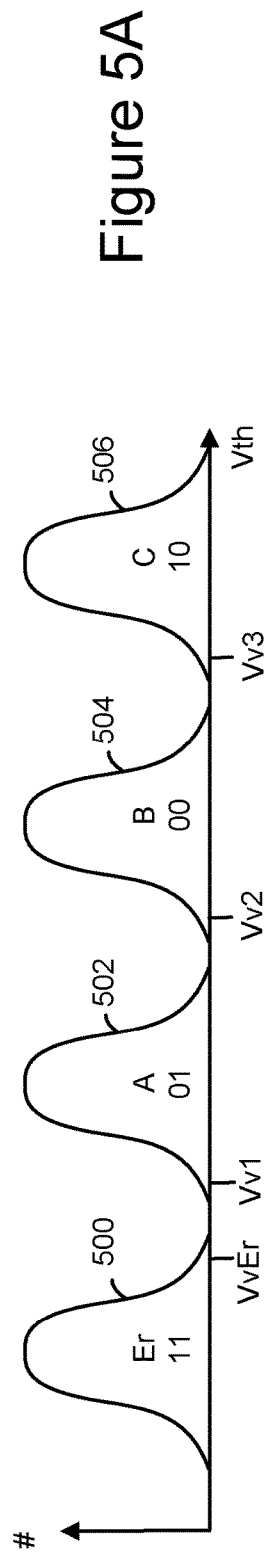
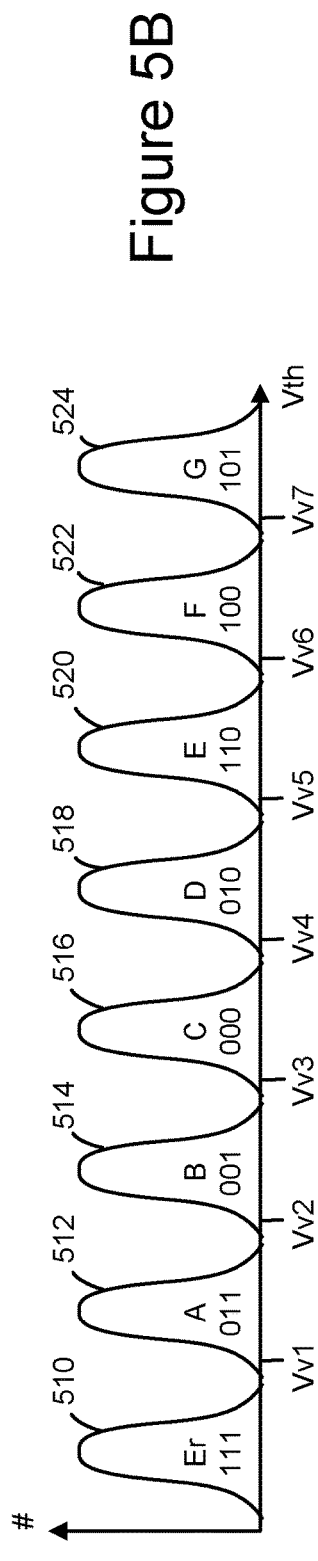
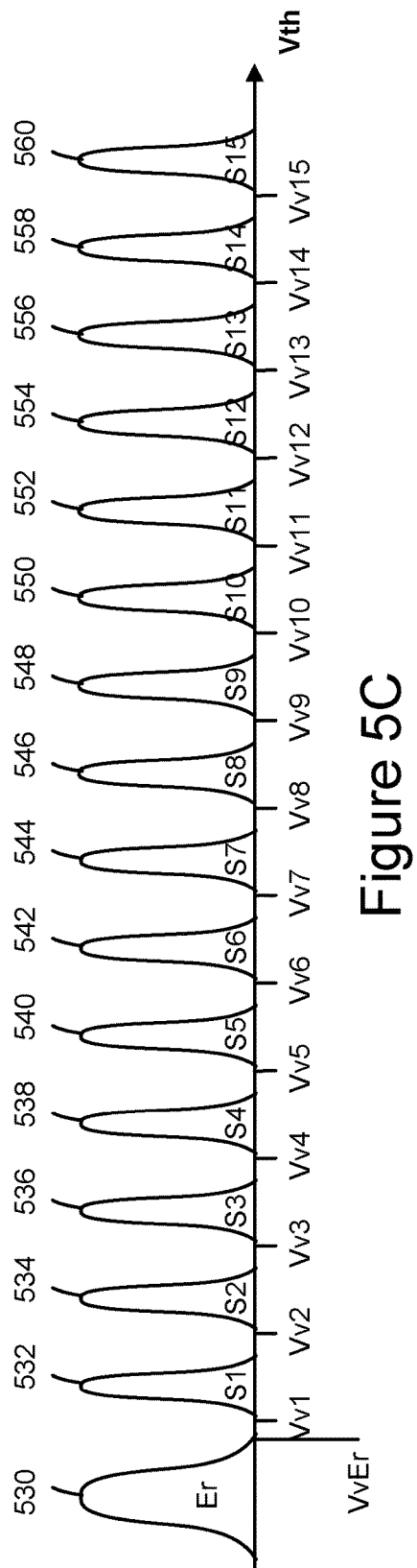
Figure 5A
Figure 5B
Figure 5C

700

702 — Apply a high voltage (e.g., Vpgmu) to all word lines in block

704 — Apply a low voltage (e.g., Vss) to a region of the memory structure

706 — Determine whether leakage current is detected

| BL | VSS (0V) |
|---|---|
| SGD | Vsgd |
| DD | Vpass |
| WL81 to WL161 | Vpgmu |
| WLIFDU | Vpass |
| WLIFDL | Vpass |
| WL0 to WL80 | Vpgmu |
| DS | Vpass |
| SGS | Vsgs |
| SL | VSS (0V) |

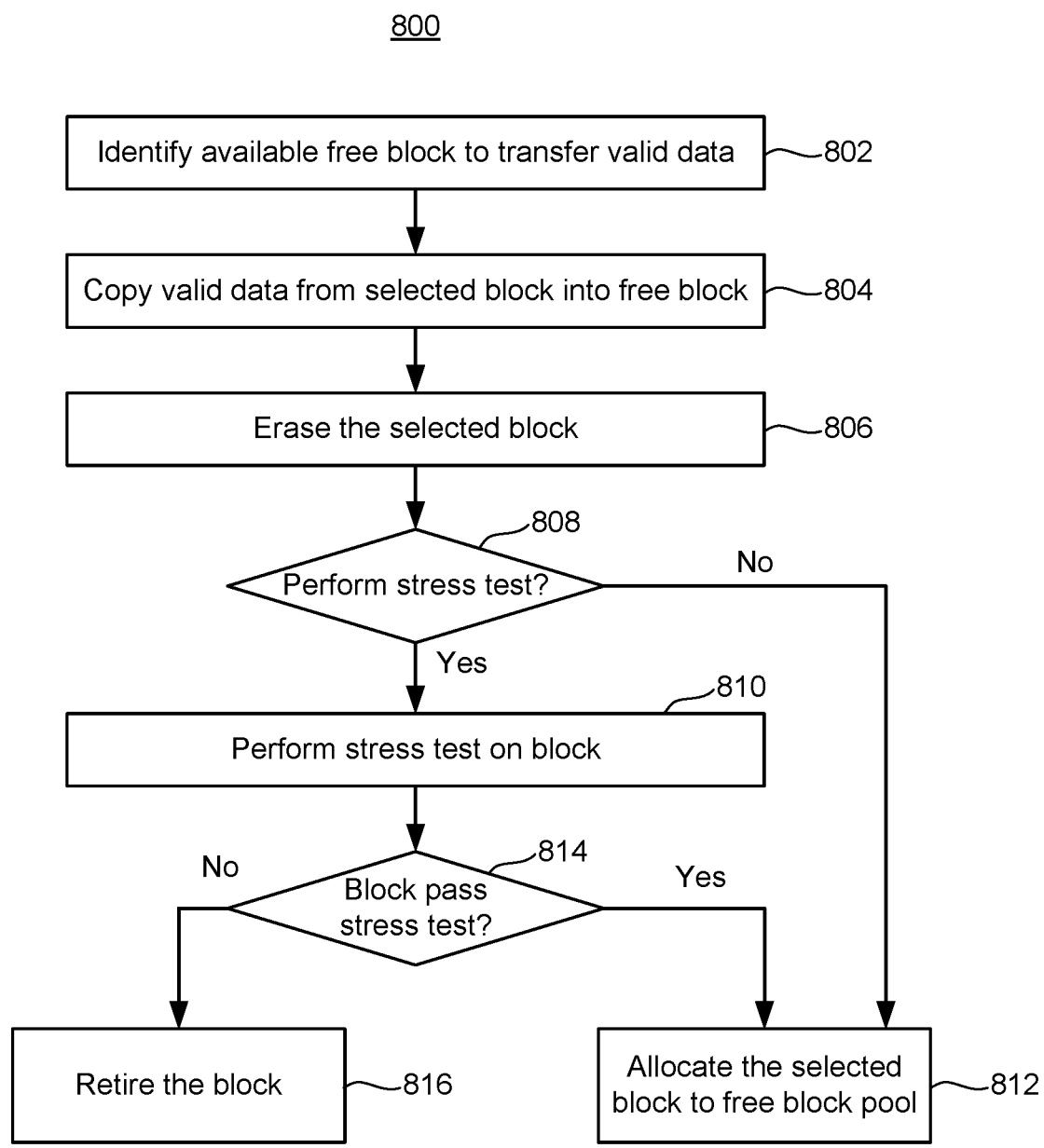

ADAPTIVE WORD LINE STRESS FOR LEAK DETECTION IN NON-VOLATILE MEMORY

CLAIM OF PRIORITY

The present application claims priority from U.S. Provisional Patent Application No. 63/505,330, entitled "ADAPTIVE WORD LINE STRESS FOR LEAK DETECTION IN NON-VOLATILE MEMORY," by Guan et al., filed May 31, 2023, incorporated by reference herein in its entirety.

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. The memory structure may be three-dimensional. One type of three-dimensional structure has non-volatile memory cells arranged as vertical NAND strings. The memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the block.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as MLC programming. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

During a program operation a series of program voltage pulses are applied to the control gates of the memory cells. Each voltage pulse may be stepped up in magnitude from a previous program pulse by a step size in a process referred to as incremental step pulse programming. Each program voltage may be followed by a verify operation to determine if the respective memory cells have been programmed to the desired memory state. Thus, the program operation may include a number of program/verify loops. The word line that is connected to the memory cells being verified is referred to herein as the "selected word line." The remaining word lines connected to other memory cells on the NAND strings are referred to herein as "unselected word lines."

Following manufacturing defects may exist in the memory structure. For example, there could be a short circuit between a word line and a NAND string. There could be a short circuit between a word line and conductive line such as a source line. Such defects can result in dysfunction of memory operations such as erase, program, and/or read. Such defects can potentially result in data loss. Therefore, the memory structure is typically tested after manufacture to detect such defects. Regions of the memory structure having a defect may be retired. For example, a block of memory cells that contains a defect may be marked as a bad block such that it is not used in the field.

Normal memory operations in the field create a small amount of stress on the memory structure. Over time it is possible that the cumulative stress from many memory operations can create a defect. Herein the term "grown bad block" refers to a block of memory cells that develop a defect in the field. Some memory systems will test for and retire grown bad blocks. For example, some systems may test for defects during a program operation. However, testing for defects during a program operation may impact performance.

BRIEF DESCRIPTION OF THE DRAWINGS

Like-numbered elements refer to common components in the different figures.

FIGS. 5A, 5B and 5C depict threshold voltage distributions.

FIG. 8 is a flowchart of one embodiment of a process of detecting grown bad blocks in a non-volatile storage system.

DETAILED DESCRIPTION

Technology is disclosed herein for detecting short circuits involving word lines in a non-volatile storage system. A word line that is involved in a short circuit (or more briefly "short") is referred to herein as a "leaky word line," which refers to current leakage that occurs as a result of the short circuit. The short circuit may include, but is not limited to, a word line to NAND channel short, a word line to conductive line short, and/or a word line to source line short. Testing for word line leakage can be performed as part of a set of tests performed on a memory die before the device is shipped to determine defects at the level of individual word lines, individual blocks, or at the level of the die, so that defective elements can be mapped out or even the whole die determined as defective. Word line leakage can also be detected during a built-in self-test (BIST) once a device is in use.

Word line leak detection can be performed by stressing an array by applying a high voltage, such as a program voltage, to a set of stress selected word lines while other parts of the array are set to a low voltage. For example, to test for word line to memory hole leakage in a 3D NAND memory, all of the word lines of a block can be biased to the high stress voltage, while the source and bit lines are biased to ground. After stressing the array, the current drawn by the stress selected word lines can then be monitored to determine leakage. The amount of stress applied during the test process is an important consideration, since enough stress needs to be applied to determine defects and reduce the proportion of defective devices shipped out, but not so much stress as to induce defects and reduce device yields. To help to minimize this problem, the following presents a self-adaptive word line leakage test, in which higher leakage devices receive more stress, while lower leakage devices are subjected to less stress.

More specifically, in a word line leakage detection process, a stress selected set of word lines have a high stress voltage applied while other parts of an array are biased to a low level. For example, to check for word line to memory hole leakage in a 3D NAND memory device, all word lines of a block can be biased at a program voltage while the memory hole structure is set to ground though the source and bit lines bias level. While stressing the memory array, the current drawn by the array is compared to a leakage detection current that increases in amplitude. In an example embodiments, this can be done by mirroring the array current and comparing this with the current from a current source that increases in response to a digital input value and determining when it exceeds the mirror current, at which point the stress is discontinued. In addition to determining the amount of leakage, this approach results in low leakage word lines receiving less stress, while greater leakage result in greater amounts of stress being applied.

Figure 1:
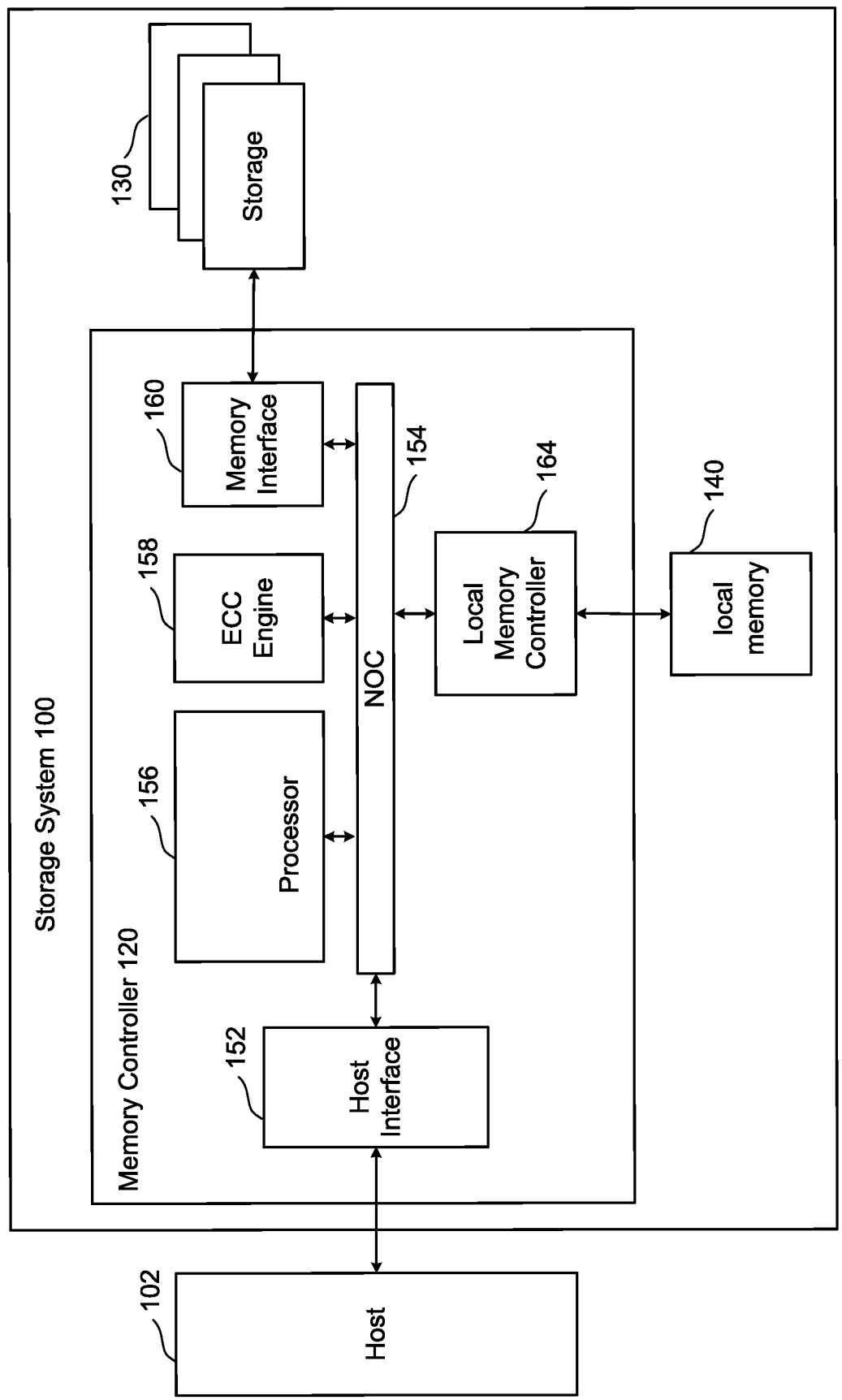
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
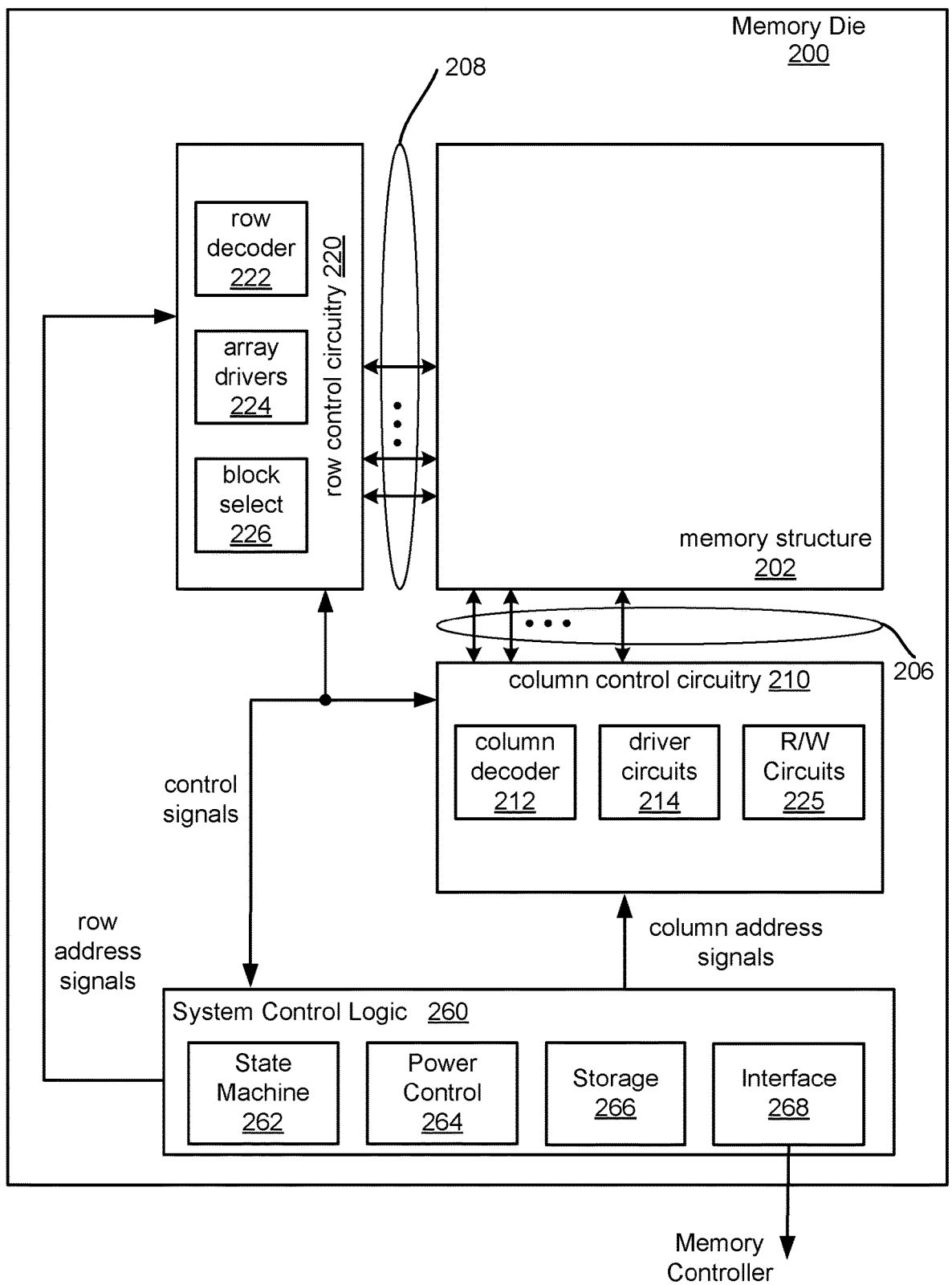
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, as well as read/write circuitry 225, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
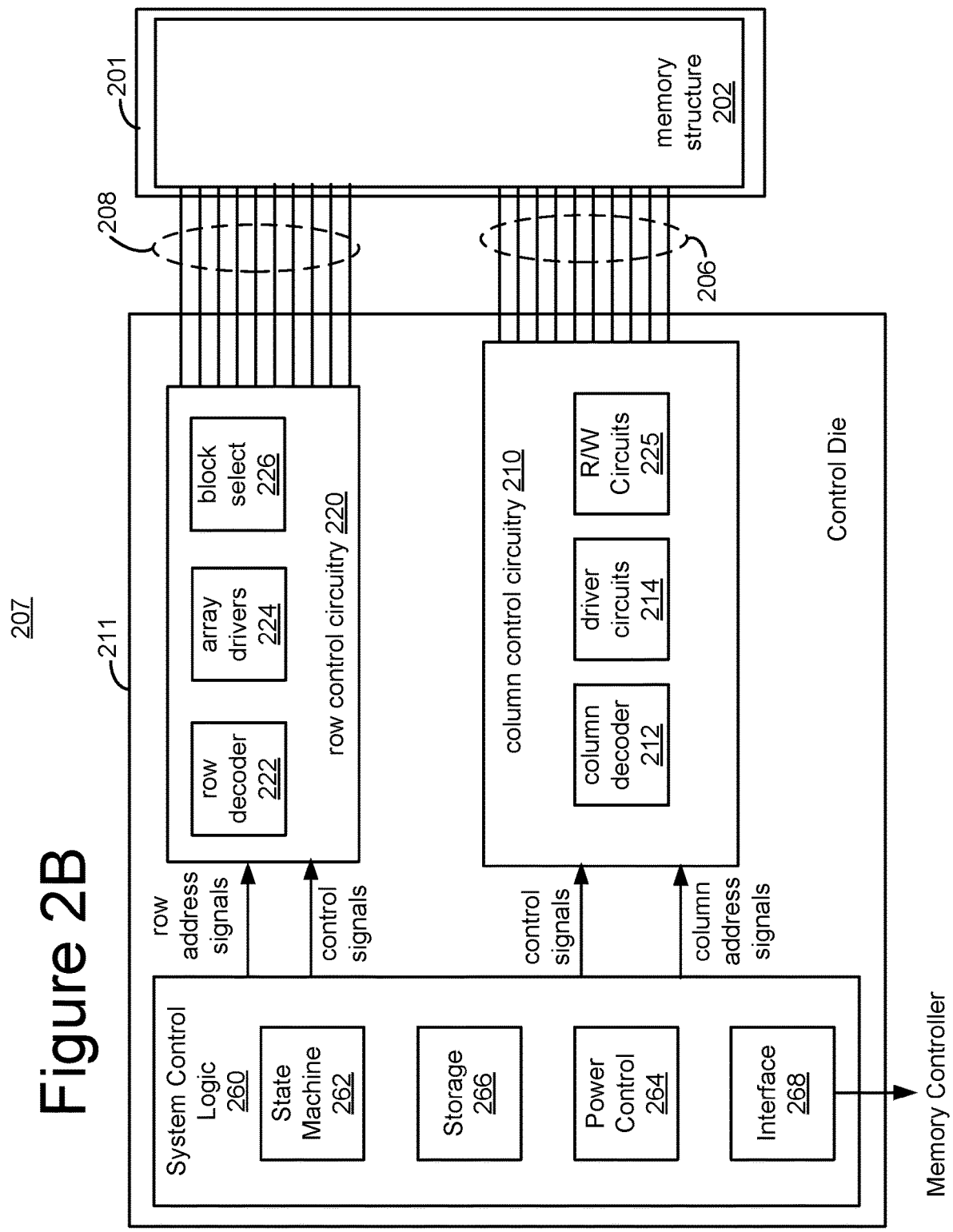
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and R/W circuits 225 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 3A:
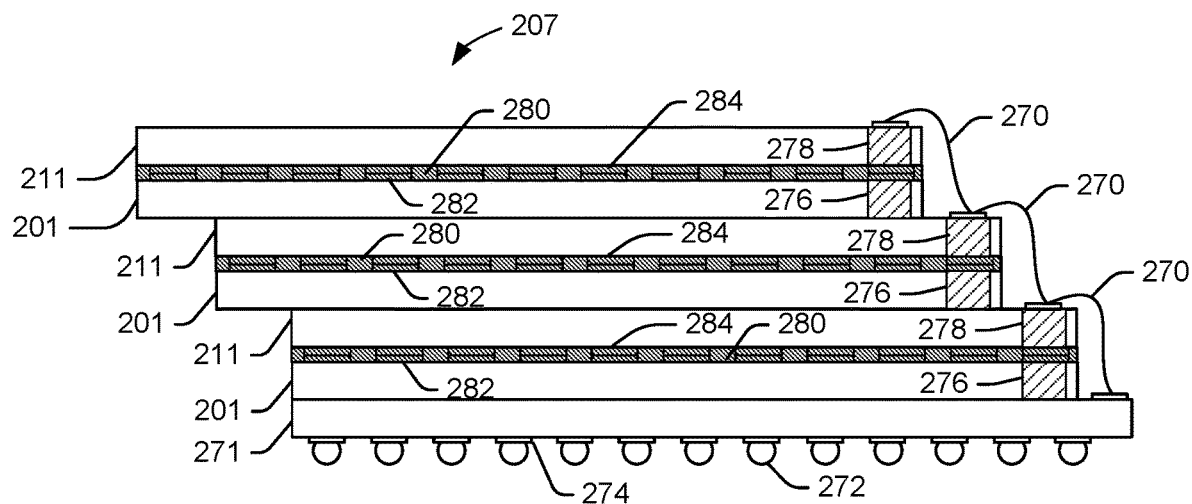
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280, but in embodiments, it may be Hysol epoxy resin from Henkel Corp., having offices in California, USA.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
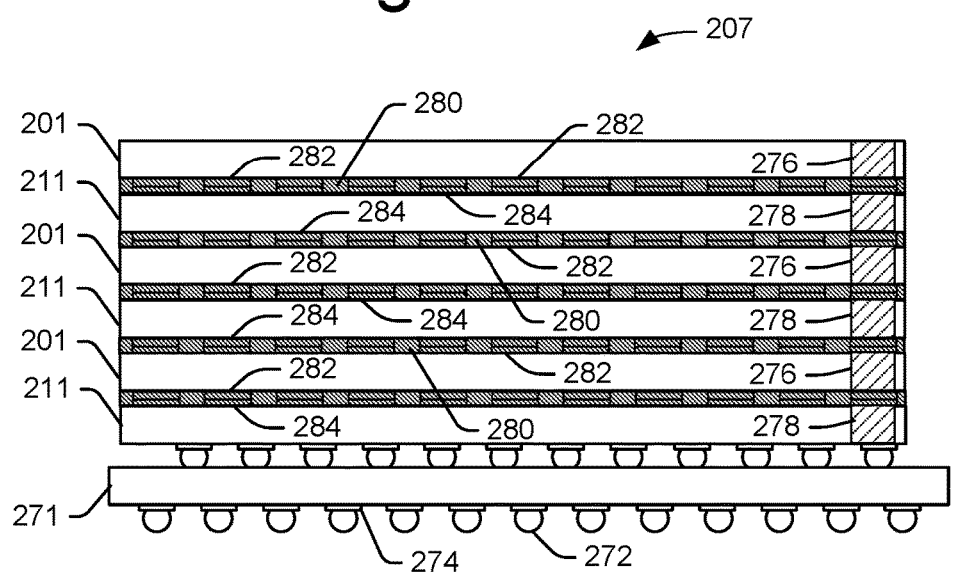

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 4:
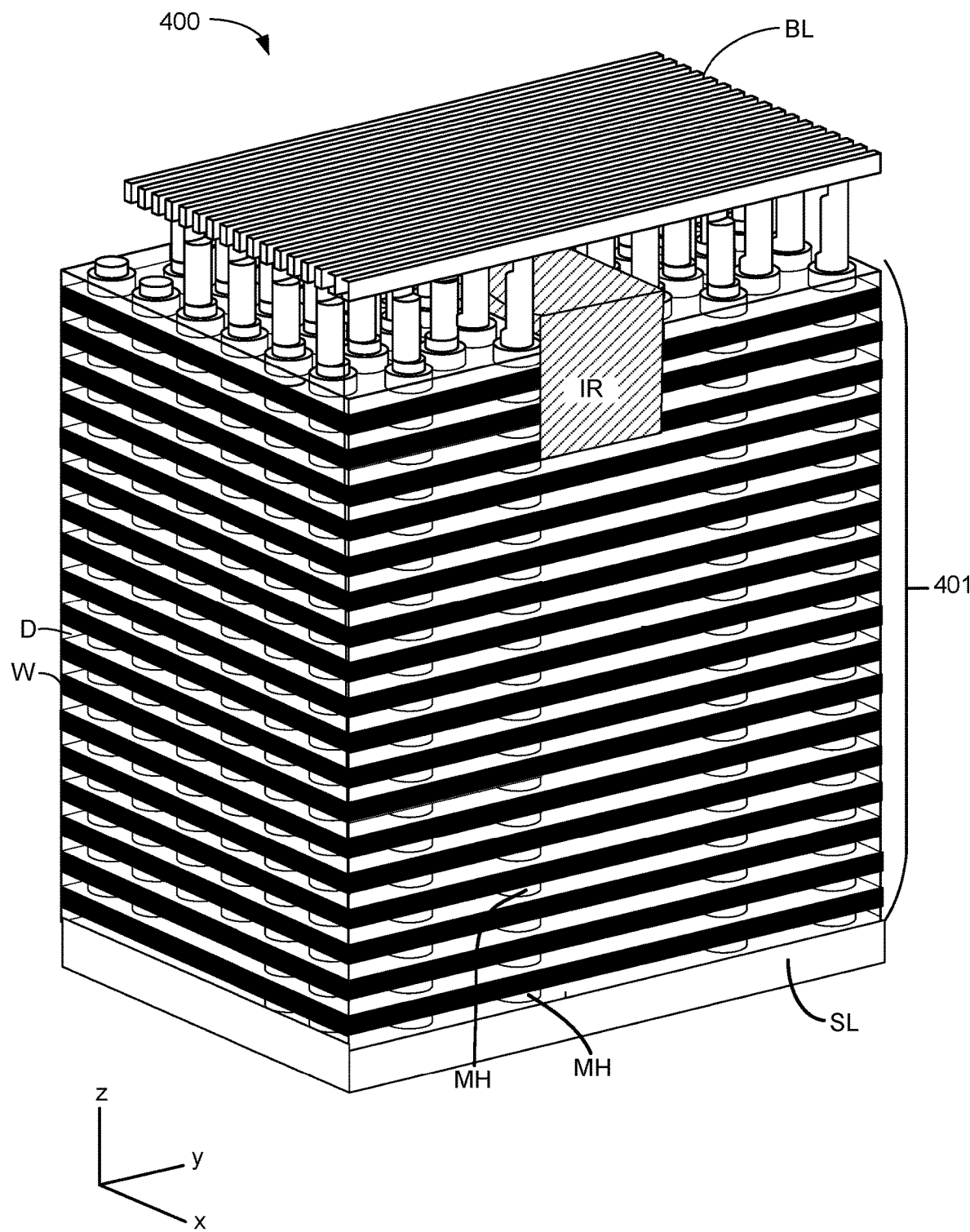
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
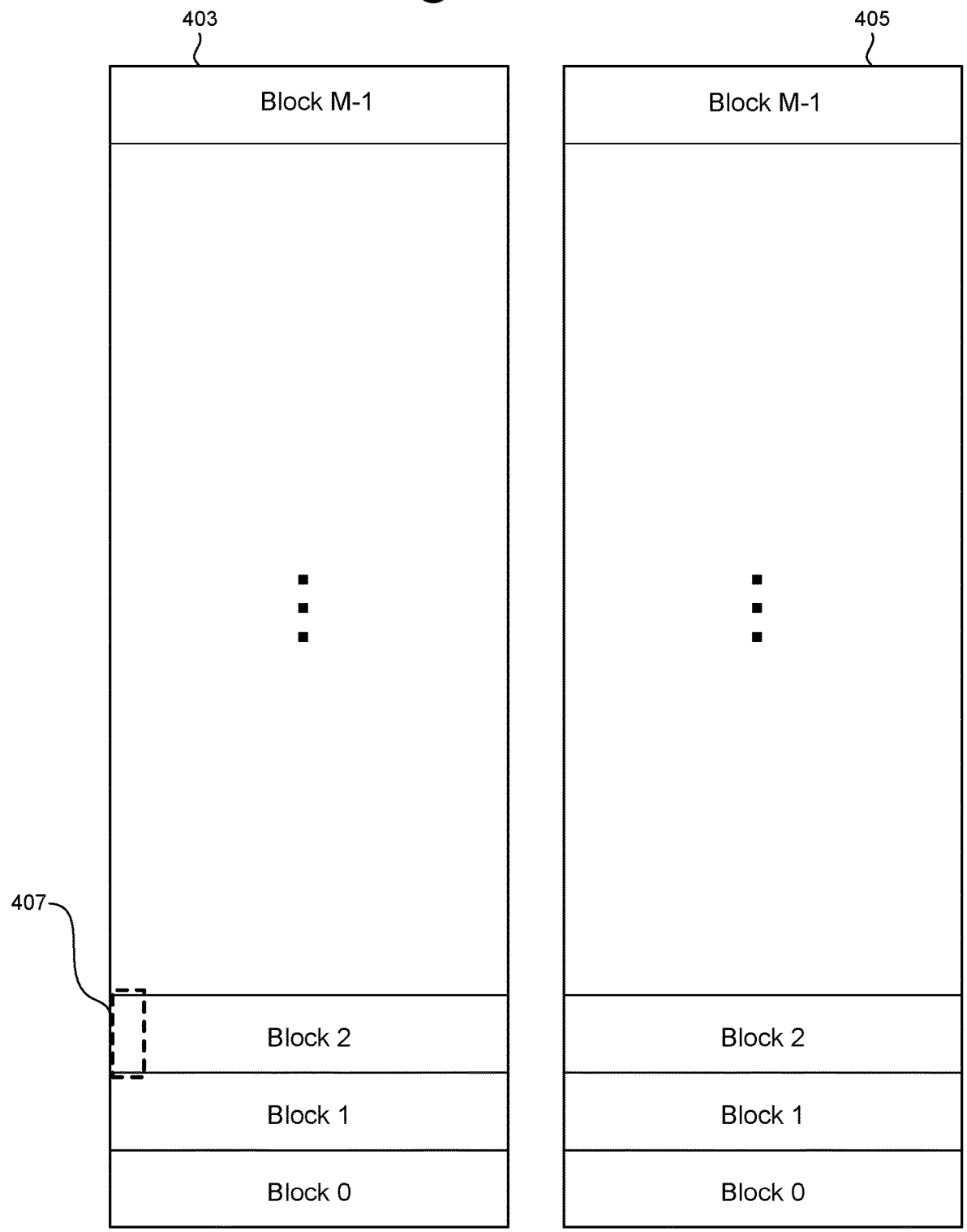
FIG. 4A is a block diagram of one embodiment of a memory structure having two planes.

FIG. 4A is a block diagram explaining one example organization of memory structure 202, which is divided into two planes 403 and 405. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
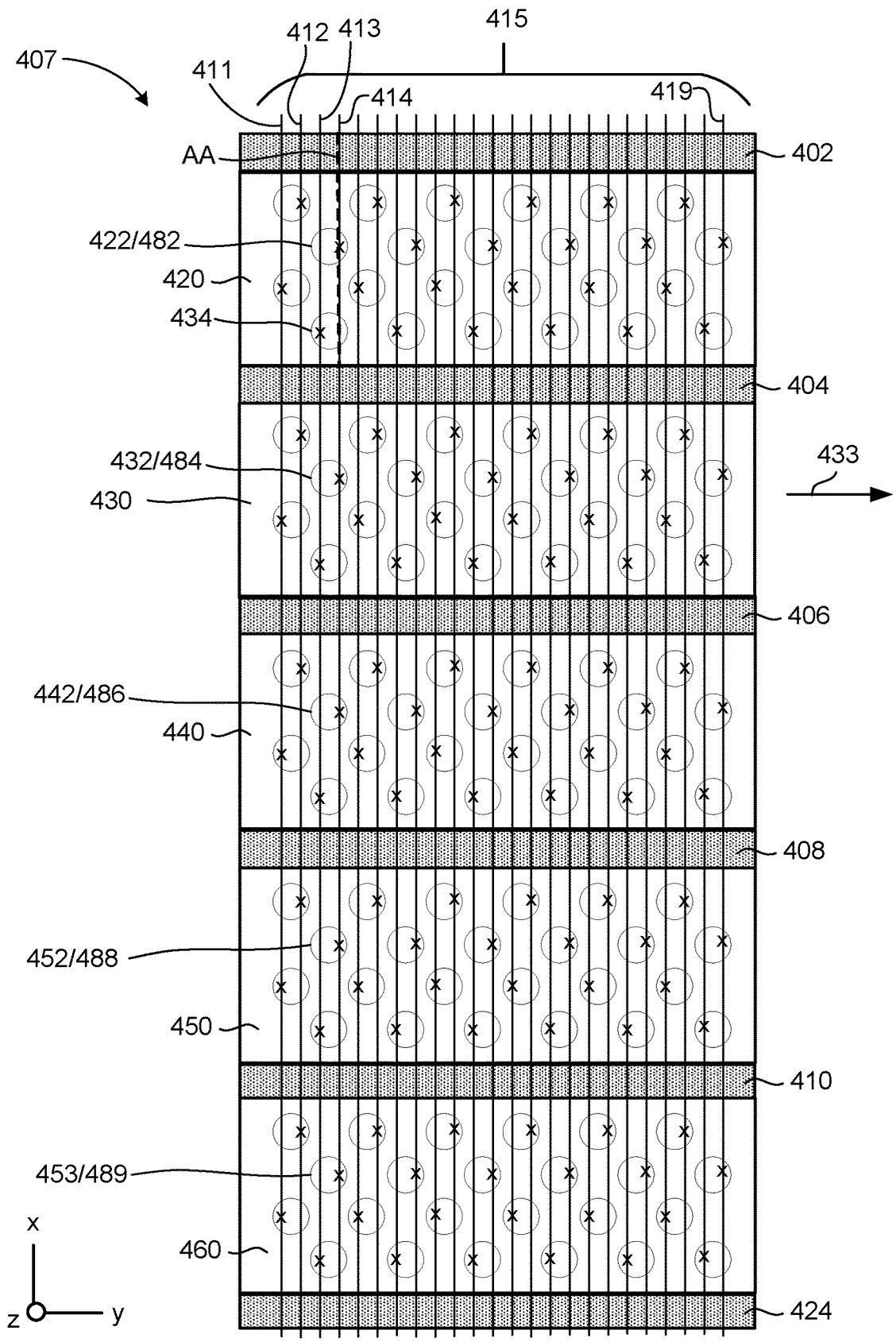
FIG. 4B is a block diagram depicting a top view of a portion of block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a block diagram depicting a top view of a portion 407 of Block 2. As can be seen from FIG. 4B, the block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452, and 453. Vertical column 422 implements NAND string 482. Vertical column 432 implements NAND string 484. Vertical column 442 implements NAND string 486. Vertical column 452 implements NAND string 488. Vertical column 453 implements NAND string 489. More details of the vertical columns are provided below. Since the block depicted in FIG. 4B extends in the direction of arrow 433, the block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442, 452, and 453.

The block depicted in FIG. 4B includes a set of isolation regions 402, 404, 406, 408, 410, and 424, which are formed of $SiO_2$; however, other dielectric materials can also be used. Isolation regions 402, 404, 406, 408, 410, and 424 serve to divide the top layers of the block into five regions; for example, the top layer depicted in FIG. 4B is divided into regions 420, 430, 440, 450, and 460 of which are referred to as sub-blocks. In one embodiment, isolation regions 402 and 424 separate the block from adjacent blocks. Thus, isolation regions 402 and 424 may extend down to the substrate. In one embodiment, the isolation regions 404, 406, 408, and 410 only divide the layers used to implement select gates so that NAND strings in different sub-blocks can be independently selected. Referring back to FIG. 4, the IR region may correspond to any of isolation regions 404, 406, 408 or 410. In one example implementation, a bit line only connects to one vertical column/NAND string in each of regions (sub-blocks) 420, 430, 440, 450 and 460. In that implementation, each block has twenty rows of active columns and each bit line connects to five vertical columns/NAND strings in each block. In one embodiment, all of the five vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B shows each region having four rows of vertical columns, five regions and twenty rows of vertical columns in a block, those exact numbers are an example implementation. Other embodiments may include more or fewer regions per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
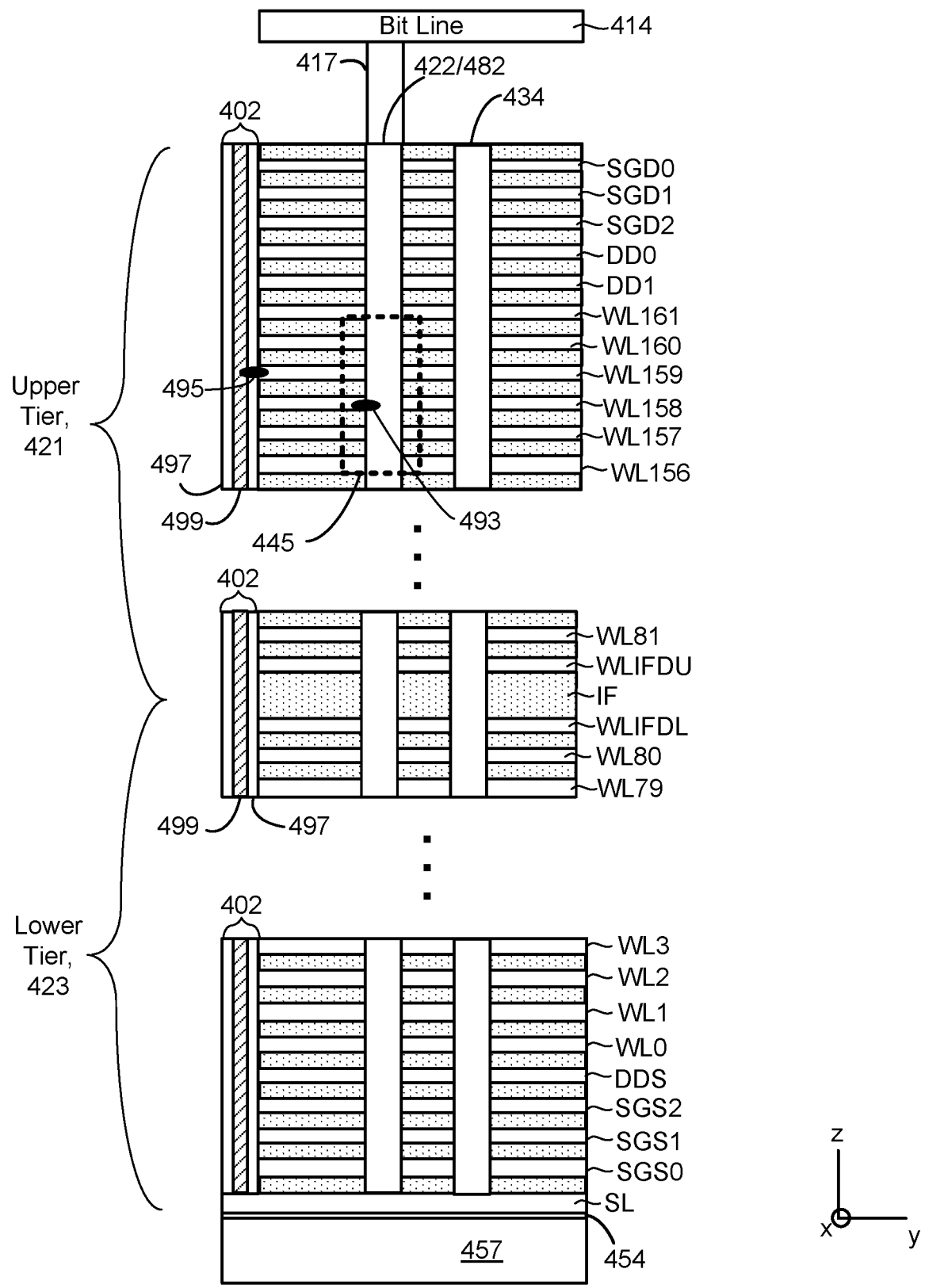
FIG. 4C depicts an embodiment of a stack showing a cross-sectional view along line AA of FIG. 4B.

FIG. 4C depicts a portion of one embodiment of a three dimensional memory structure 202 showing a cross-sectional view along line AA of FIG. 4B. This cross sectional view cuts through vertical columns (NAND strings) 422 and 434 of region 420 (see FIG. 4B). The structure of FIG. 4C includes three drain side select gate layers (SGD0, SGD1 and SGD2). The structure of FIG. 4C also includes three source side select gate layers (SGS0, SGS1 and SGS2). The structure of FIG. 4C also includes five dummy word line layers DD0, DD1, WLIFDU, WLIDDL, DDS; one hundred sixty two word line layers WL0-WL161 for connecting to data memory cells. Dielectric layers are depicted between the conductive layers just described. Other embodiments can be implemented more or fewer than the numbers described above for FIG. 4C. In one embodiment, SGD0, SGD1 and SGD2 are electrically connected together; and SGS0, SGS1 and SGS2 are electrically connected together.

FIG. 4C depicts an embodiment of a stack having two tiers. The two-tier stack comprises an upper tier 421 and a lower tier 423. A two-tier other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole was etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Vertical columns 432 and 434 are depicted protruding through the drain side select layers, source side select layers, IF layer, dummy word line layers and word line layers. In one embodiment, each vertical column comprises a vertical NAND string. Below the vertical columns and the layers listed below is substrate 457, an insulating film 454 on the substrate, and source line SL. The NAND string of vertical column 432 has a source end at the bottom of the stack and a drain end at the top of the stack. As in agreement with FIG. 4B, FIG. 4C show vertical column 432 connected to bit line 414 via connector 417.

One of the isolation regions 402 is depicted adjacent to the stack, in agreement with FIG. 4B. The isolation region 402 has a conductive region 499 surrounded by an insulating material 497. The conductive region 499 extends down to the source line (SL) and provides operating voltages to the SL. The conductive region 499 may be formed from, for example, tungsten. The insulating material 497 may be formed from, for example, silicon oxide. It is possible for a short circuit to occur between a word line and the conductive region 499. An example defect 495 that results in a short circuit between WL159 and the conductive region 499 is depicted. The conductive region 499 may be referred to herein as a local interconnect (LI). In one embodiment, such word line to LI short circuits are detected. Defects such as defect 495 may be present when the memory structure is manufactured or may develop as a result of normal memory operations.

Another type of short circuit that may be detected is a word line to memory hole short circuit. Defect 493 may result in a short circuit between WL158 and the memory hole 422. In one embodiment, such word line to memory hole short circuits are detected. Defects such as defect 493 may be present when the memory structure is manufactured or may develop as a result of normal memory operations.

For ease of reference, drain side select layers, source side select layers, dummy word line layers, and data word line layers collectively are referred to as the conductive layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers. In one embodiment, the dielectric layers are made from SiO$_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WL0-W161 connect to memory cells (also called data memory cells). Dummy word line layers DD0, DD1 and DDS connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0, SGD1, and SGD2 are used to electrically connect and disconnect (or cut off) the channels of respective NAND strings from bit lines. Source side select layers SGS0, SGS1, and SGS2 are used to electrically connect and disconnect (or cut off) the channels of respective NAND strings from the source line SL.

Figure 4D:
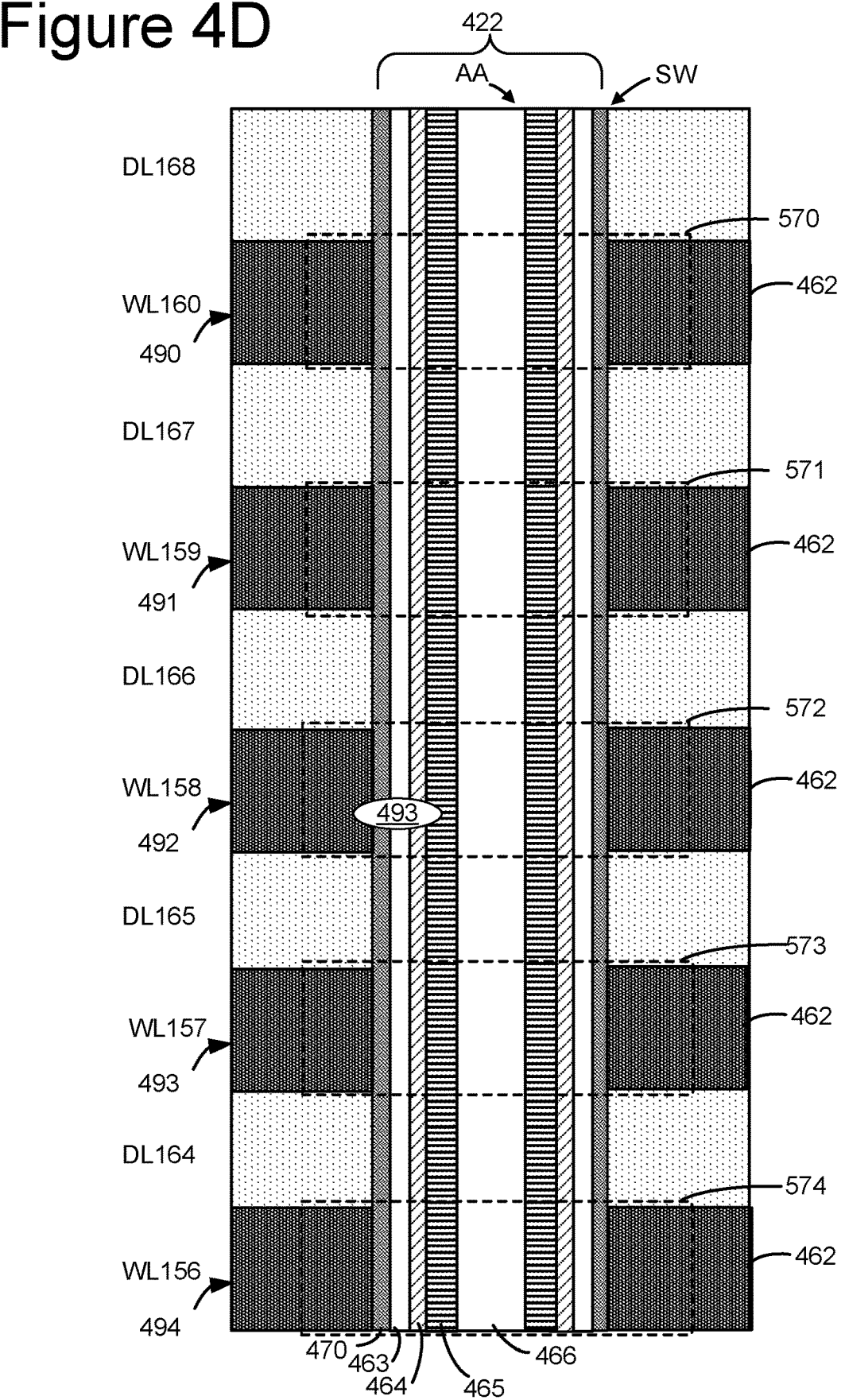
FIG. 4D depicts a view of the region 445 of FIG. 4C.

FIG. 4D depicts a view of the region 445 of FIG. 4C. Included are WL156-160 and dielectric layers DL164-DL168. Data memory cell transistors 570, 571, 572, 573, and 574 are indicated by the dashed lines. A number of layers can be deposited along the sidewall (SW) of the memory hole 422 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

As mentioned above, one type of short circuit that may be detected is a word line to memory hole short circuit. Defect 493 may result in a short circuit between WL158 and one or more of the layers in the memory hole 422 such as, for example, charge-trapping layer 463 and/or polysilicon body 465. In one embodiment, such word line to memory hole short circuits are detected.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
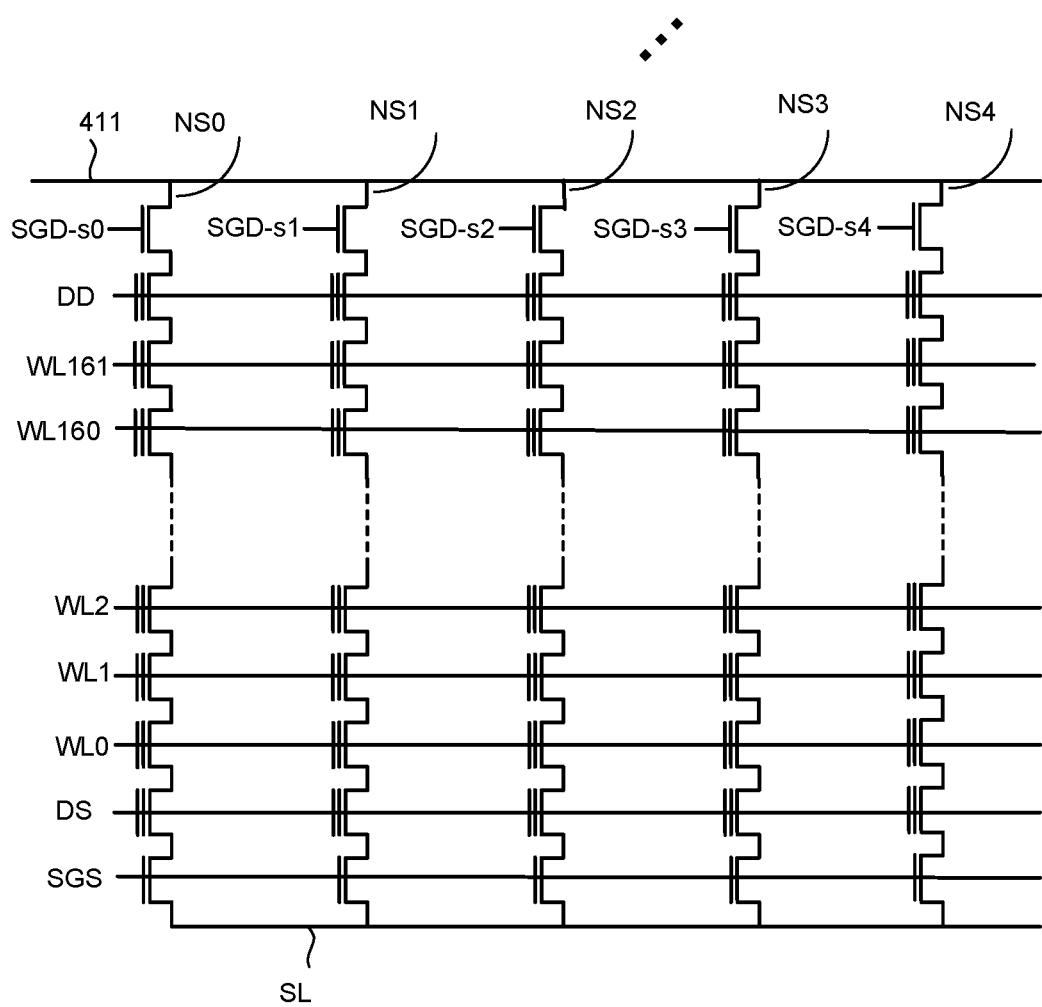
FIG. 4E is a schematic diagram of a portion of one embodiment of a block, depicting several NAND strings.

FIG. 4E is a schematic diagram of a portion of the memory depicted in FIGS. 4-4D. FIG. 4E shows physical word lines WL0-WL161 running across the entire block. The structure of FIG. 4E corresponds to portion 407 in Block 2 of FIGS. 4A-4B, including bit lines 411, 412, 413, 414, . . . 419. Within the block, each bit line is connected to four NAND strings. Drain side selection lines SGD-s0, SGD-s1, SGD-s2, SGD-s3 and SGD-s4 are used to determine which of the five NAND strings (NS0, NS1, NS2, NS3, NS4) connect to the associated bit line. Other NAND strings of the block and other bit lines are not depicted in FIG. 4E. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. There may be more or fewer than five sub-blocks in a block.

A source side selection line SGS connects/disconnects the NAND strings to/from the common source line. In some embodiments, there is a source side selection line for each sub-block (similar to the five SGD-s0, SGD-s1, SGD-s2, SGD-s3 and SGD-s4). The block can also be thought of as divided into five sub-blocks SB0, SB1, SB2, SB3, SB4. Sub-block SB0 corresponds to those vertical NAND strings controlled by SGD-s0, Sub-block SB1 corresponds to those vertical NAND strings controlled by SGD-s1, Sub-block SB2 corresponds to those vertical NAND strings controlled by SGD-s2, Sub-block SB3 corresponds to those vertical NAND strings controlled by SGD-s3, and Sub-block SB4 corresponds to those vertical NAND strings controlled by SGD-s4.

Although the example memories of FIGS. 4-4E are three dimensional memory structure that includes vertical NAND strings with charge-trapping material, other (2D and 3D) memory structures can also be used with the technology described herein.

The memory systems discussed above can be erased, programmed and read. Each memory cell may be associated with a memory state according to write data in a program command. Based on its memory state, a memory cell will either remain in the erased state or be programmed to a memory state (a programmed memory state) different from the erased state.

For example, in a two-bit per cell memory device (sometimes referred to as a multi-level cell (MLC)), there are four memory states including the erased state and three programmed memory states referred to as the A, B and C memory states. In a three-bit per cell memory device (sometimes referred to as a tri-level cell (TLC)), there are eight memory states including the erased state and seven programmed memory states referred to as the A, B, C, D, E, F and G memory states. In a four-bit per cell memory device (sometimes referred to as a quad-level cell (QLC)), there are sixteen memory states including the erased state and fifteen programmed memory states referred to as the Er, S1, S2, S3, S4, S5, S6, S7, S8, S9, S10, S11, S12, S13, S14 and S15 memory states.

FIG. 5A depicts an embodiment of threshold voltage Vth distributions for a four-state memory device in which each memory cell stores two bits of data. A first threshold voltage Vth distribution 500 is provided for erased (Er-state) storage elements. Three threshold voltage Vth distributions 502, 504 and 506 represent programmed memory states A, B and C, respectively. A 2-bit code having lower and upper bits can be used to represent each of the four memory states. In an embodiment, the "Er," "A," "B," and "C" memory states are respectively represented by "11," "01," "00," and "10."

FIG. 5B depicts an embodiment of threshold voltage Vth distributions for an eight-state memory device in which each memory cell stores three bits of data. A first threshold voltage Vth distribution 510 is provided for Er-state storage elements. Seven threshold voltage Vth distributions 512, 514, 516, 518, 520, 522 and 524 represent programmed memory states A, B, C, D, E, F and G, respectively. A 3-bit code having lower page, middle page and upper page bits can be used to represent each of the eight memory states. In an embodiment, the "Er," "A," "B," "C," "D," "E," "F" and "G" memory states are respectively represented by "111," "011," "001," "000," "010," "110," "100" and "101."

FIG. 5C depicts an embodiment of threshold voltage Vth distributions for a sixteen-state memory device in which each memory cell stores four bits of data. A first threshold voltage Vth distribution 530 is provided for erased Er-state storage elements. Fifteen threshold voltage Vth distributions 532, 534, 536, 538, 540, 542, 544, 546, 548, 550, 552, 554, 556, 558 and 560 represent programmed memory states S1, S2, S3, S4, S5, S6, S7, S8, S9, S10, S11, S12, S13, S14 and S15, respectively.

A 4-bit code having lower page, middle page, upper page and top page bits can be used to represent each of the sixteen memory states. In an embodiment, the S0, S1, S2, S3, S4, S5, S6, S7, S8, S9, S10, S11, S12, S13, S14 and S15 memory states are respectively represented by "1111," "1110," "1100," "1101," "1001," "0001," "0101," "0100," "0110," "0010," "0000," "1000," "1010," "1011," "0011," and "0111," respectively.

The technology described herein also can be used with other types of programming in addition to full sequence programming (including, but not limited to, multiple stage/phase programming). In some embodiments, programmed states (e.g., S1-S15) can overlap, with controller 120 (FIG. 1) relying on error correction to identify the correct data being stored.

Figure 6:
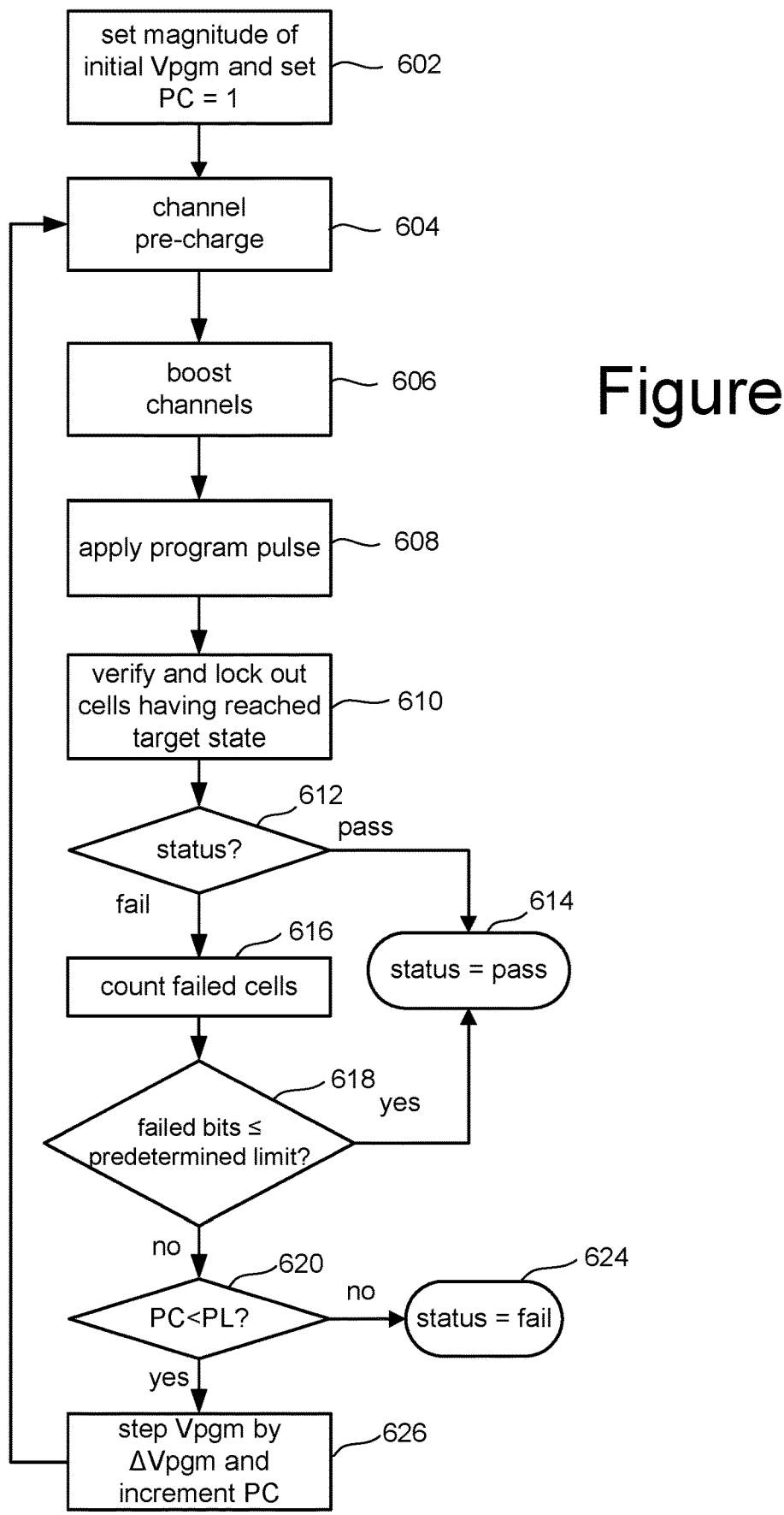
FIG. 6 is a flowchart describing one embodiment of a process for programming memory cells.

FIG. 6 is a flowchart describing one embodiment of a process for programming memory cells. For purposes of this document, the term program and programming are synonymous with write and writing. In one example embodiment, the process of FIG. 6 is performed for memory structure 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory structure die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process.

Typically, the program voltage applied to the control gates (via a selected data word line) during a program operation is applied as a series of program pulses (e.g., voltage pulses). Between programming pulses a set of verify pulses (e.g., voltage pulses) may be used to perform verification. In many implementations, the magnitude of the program pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606. NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage and is applied to the bit lines coupled with the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program verify is performed and memory cells that have reached their target states are locked out from further programming by the control die. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state. For example, a memory cell may be locked out if it reaches a verify reference voltage.

If, in step 612, it is determined that all of the memory cells have reached their target threshold voltages (pass), the programming process is complete and successful because all selected memory cells were programmed and verified to their target states. A status of "PASS" is reported in step 614. Otherwise if, in step 612, it is determined that not all of the memory cells have reached their target threshold voltages (fail), then the programming process continues to step 616.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming fewer than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 620 and the program counter PC is checked against the program limit value (PL). Examples of program limit values include 6, 12, 16, 19, 20 and 30; however, other values can be used. If the program counter PC is not less than the program limit value PL, then the program process is considered to have failed and a status of FAIL is reported in step 624. If the program counter PC is less than the program limit value PL, then the process continues at step 626 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 626, the process loops back to step 604 and another program pulse is applied to the selected word line so that another iteration (steps 604-626) of the programming process of FIG. 6 is performed.

In one embodiment memory cells are erased prior to programming, and erasing is the process of changing the threshold voltage of one or more memory cells from a programmed data state to an erased data state. For example, changing the threshold voltage of one or more memory cells from states A-C to state E of FIG. 5A, from states A-G to state Er of FIG. 5B, or from states S1-S15 to state Er of FIG. 5C.

3D NAND flash memory is widely used for storage and data transfer in consumer devices, enterprise systems and industrial applications because of its nonvolatility, affordability, high storage density and access speeds. 3D NAND memory's capacity has enlarged significantly as the vertical layers (number of word lines) of the array have increased in number and become thinner. Because of this, word line related defects present a major challenge in device development. The common method to counter word line related defects is a combination of stress and screen. Engineers use stress to make the defective points weaker and choose a proper screen to detect the defects and before the devices are passed on to the consumer. The selection of stress conditions is very important for the product screening since, if the defective parts of the memory array do not get enough stress, it may later become defective (often measured in defective parts per million, or DPPM) and make quality suffer. However, stressing the array can also be harmful since, if good parts were over stressed, they may be damaged and screened out, reducing yields and causing profits to suffer. Engineers will often invest a lot of resources on finding suitable stress conditions, as this can be a complex trade-off between quality control and yield. Since NAND memory has a complex hierarchy of die, plane, block, word line and so on, the variations within these different levels of hierarchy are complicated. The die-to-die variations and block-to-block variations make it even harder for engineers to decide on stress conditions. The following considers stress methods with die/block variations taken into consideration for better yield and DPPM of NAND memory die. Although the discussion is presented in the context of 3D NAND memory as described above, it can more generally applied to other memory technologies, such as MRAM or PCM, that can suffer from leakages from word lines or other control lines of the memory array.

Figures 7A, 7B:
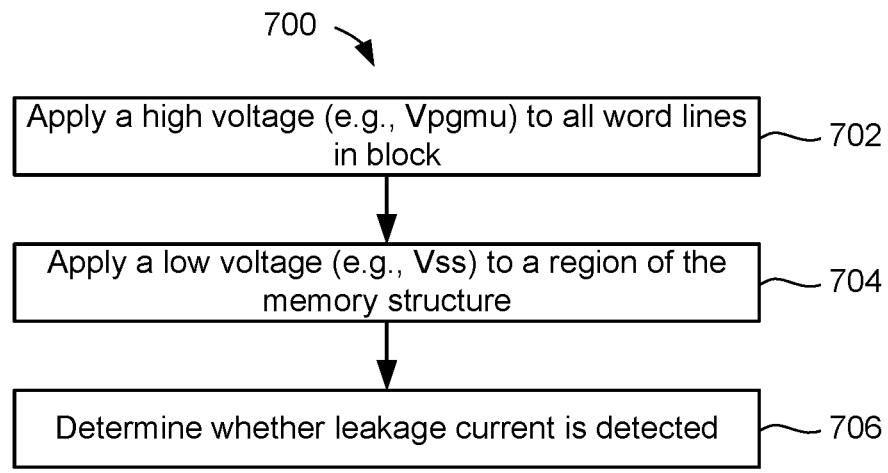
FIG. 7A is a flowchart of one embodiment of a process of determining whether a block of word lines contains a leaky word line.
FIG. 7B is a table that provides further details of voltages applied during an embodiment of the process of FIG. 7A.

To determine word line leakage, one or more of the word lines of a memory block or blocks are charged to a high stress voltage, such as a program voltage Vpgm, while other elements of the array are biased at a low voltage, such as Vss or 0V. The charged up word lines are then checked to see whether there is leakage current. Which word lines are biased at the stress voltage and what array elements are biased low depends on the test mode, where several test modes may be performed. The testing can be part of the test process performed on memory die before they are shipped out for customer use or, in other cases, such tests can also be formed once the memory die is in use. For example, leaky word lines may be detected during a built-in self-test (BIST). The specific type of test modes performed will depend on the specifics of the memory die, but for some examples in the 3D NAND memory example are tests for word line to memory hole leakage, word line to word line leakage, and word line to local interconnect leakage. Additionally, the test can be performed at different level of granularity, such as at the die level, block level, sub-block level, or word line level. FIGS. 7A and 7B consider an example of a block level leakage test.

FIG. 7A is a flowchart of one embodiment of a process 700 for determining whether a block of word lines contains a leaky word line. Step 702 includes applying a high voltage (e.g., Vpgmu) to all word lines in the block. Note that the program voltage used during program operations may vary depending on the program loop. The voltage Vpgmu may be the highest of these program voltages, or even higher than the highest program voltage typically used during a program operation. As one example, Vpgmu could be 25V. However, Vpgmu could be higher or lower than 25V. In one embodiment, the system control logic 200, including the state machine 262, instructs the control gate decoder of row control circuitry 220 to apply the high voltage to all word lines in the block. Step 704 includes applying a low voltage to a region of the memory structure. In one embodiment, the low voltage is applied to a source line in order to test for a word line to source line short. In one embodiment, the low voltage is applied to a bit line in order to test for a word line to memory hole short. In one embodiment, the low voltage is applied to both the bit line and the source line to test for either a word line to memory hole short or a word line to memory hole short. Step 706 includes determining whether a leakage current is detected. In one embodiment, leakage current a detection circuit such as described below with respect to FIGS. 13-16 monitoring for a leakage current. In one embodiment, a leakage current may flow if there is a short circuit between any of the word lines in the block and the source line. In one embodiment, a leakage current may flow if there is a short circuit between any of the word lines in the block and the memory hole (e.g., the NAND string channel). Embodiments for leakage detection are discussed in more detail below.

FIG. 7B is a table that provides further details of voltages applied during an embodiment of the process 700. A high voltage (e.g., Vpgmu) is applied to all of the data word lines in this example, but a lower voltage (e.g., Vpass) may be applied to all of the dummy word lines. The data word lines in FIG. 7B are WL0 to WL80 in the lower tier and WL81 to WL161 in the upper tier. The dummy word lines in FIG. 7B include one or more source side dummy WLs (DS), a dummy word line adjacent to the IF at the top of the lower tier (WLIFDL), a dummy word line adjacent to the IF at the bottom of the upper tier (WLIFDU), and one or more drain side dummy WLs (DD). A low voltage (e.g., Vss or 0V) is applied to both the bit lines (BL) and the source line (SL). The bit lines and the source line are examples of conductive lines connected to ends of the NAND strings. The voltage Vsgd applied to the one or more SGD line may be a select voltage that turns on the drain side select gates. The voltage Vsgs applied to the one or more SGS line may be a select voltage that turns on the source side select gates. In one embodiment, the voltages that are applied as depicted in FIG. 7B will result in a high voltage on the word lines and a low voltage on the NAND channel of the memory hole to test for a word line to memory hole short circuit. In one embodiment, the voltages that are applied as depicted in FIG. 7B will result in a high voltage on the word lines and a low voltage on the source line to test for a word line to LI short circuit. In a test embodiment where only one or a sub-set of the word lines are biased with the stress voltage for testing, the non-stress selected word lines can be biased at Vpass.

As noted, testing for word line leakage can be performed as part of die sort testing before devices are shipped, be performed by the control circuitry of memory die 200 or control die 211, or both. FIG. 8 looks at an embodiment of incorporating a built-in self-test for detecting grown defects (i.e., defects that develop after the device is in use) into memory operation.

FIG. 8 is a flowchart of one embodiment of a process 800 of detecting grown bad blocks in a non-volatile storage system. The process 800 may be performed by one or more control circuits in the storage system 100. Process 800 describes detecting grown bad blocks in the context of garbage collection. Garbage collection may include data compaction in which valid data from one or more source blocks is copied to one or more destination blocks. A source block may be identified for data compaction when the amount of valid data falls below a threshold percentage. Note that detecting grown bad blocks can be performed without garbage collection. In an alternative embodiment, detecting grown bad blocks is performed in response to a special command sequence. For example, the memory controller 120 could issue a command sequence to the die (memory die 200, control die 211) to detect grown bad blocks.

Step 802 includes identifying an available free block to transfer valid data. In an embodiment, the memory controller 120 identifies one or more free blocks in the storage 130. Step 804 includes copying valid data from a selected block to the free block. This copying may include data compaction. Step 806 includes erasing the selected block after the valid data has been successfully transferred. At this time a stress test may be performed on the selected block. However, the stress test is not necessarily performed each time that the selected block is erased. In one embodiment, the stress test is performed once each n program/erase cycles. The value of n could be, for example, 10, 20, or some other value. If the stress test is not to be performed (step 808 is no), then the selected block is allocated to a free block pool in step 812. Alternatively, the stress test may be performed in step 810, where this can be as described with respect to FIGS. 7A and 7B. The stress test may accelerate stressful conditions on the memory cells and thereby provide for early detection of grown bad blocks. Moreover, the number of grown bad blocks that escape detection is kept low. Step 814 includes a determination of whether the block passes the stress test. If the block passes the stress test, then the block is allocated to the free block pool in step 812. If the block fails the stress test, then the block is retired in step 816. The block may be retired by adding the block to a list of grown bad blocks. In an embodiment, the memory controller 120 maintains the list of free blocks and grown bad blocks.

Although the techniques presented in the following can be applied to testing for word line leakage once a memory die is in use with a customer, the discussion will primary be presented in the context of pre-shipping testing, such as performed at die sort testing when defective devices can be weeded out. Traditionally, there are two main ways of applying word line stress for such tests, as illustrated by FIGS. 9 and 10.

Figure 9:
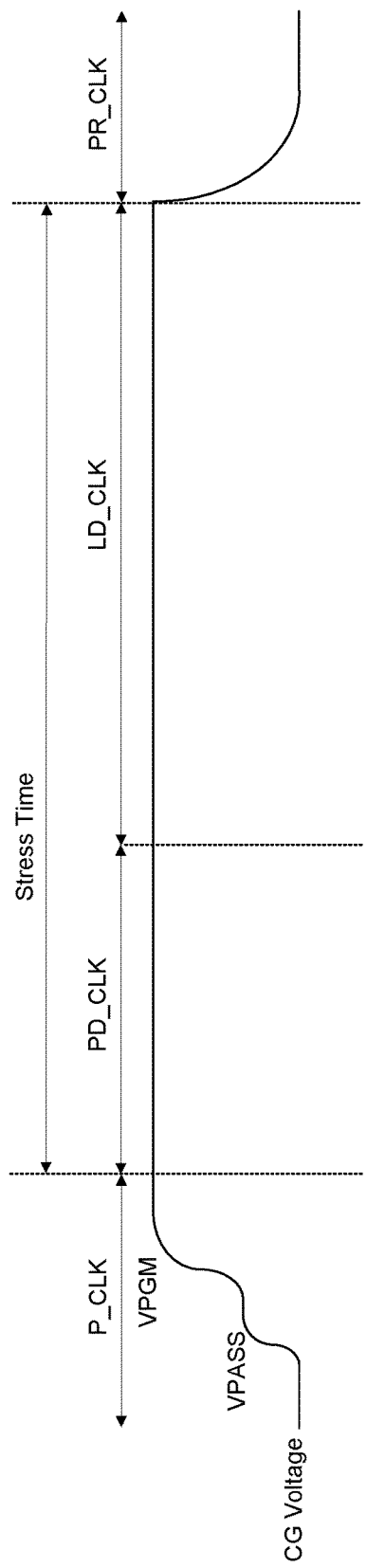
FIGS. 9 and 10 respectively present embodiments for stress-selected word line stress voltage levels using a clock count based word line leakage detection method and a manual program based word line leakage detection method.
Figure 10:
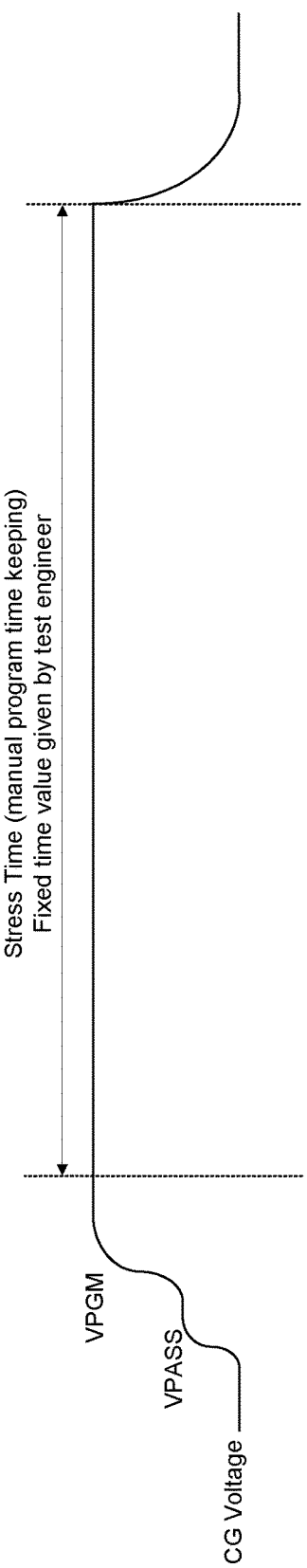

FIGS. 9 and 10 respectively present embodiments for stress-selected word line stress voltage levels using a clock count based word line leakage detection method and a manual program based word line leakage detection method. In both cases, the stress selected word line can be all of the word lines of a block or blocks, a single word line, or a sub-set of a block's word lines. For example, in a word line to memory hole or word line to local interconnect (LI) test mode, all of the word lines (or non-dummy word lines) may be selected, while in a word line to word line leakage test mode even word lines may be set to the high stress voltage level and odd word lines set to a low voltage (or vice versa). In both cases, the shown embodiments ramp up the control gate voltages on the word lines to the intermediate Vpass voltage at the same time that the dummy word lines, non-stress selected data word lines, and control gate lines are ramped up, before then further ramping up to a program voltage level. This higher word line voltage can be the Vpgmu as discussed above or other stress level.

Considering the manual program method of FIG. 10, at test time a manual program command can apply the stress voltage for a fixed stress time on all selected word lines, where this can be at the die, block, sub-block, or word line level. The stress time can be specified by a test engineer. Although this allows the stress to be specified, the stress time and amplitude values will typically be the same across all dies and blocks, such as established as part of device characterization, but would be impractical to vary from die to die or block to block as test time, given the extremely large number of dies and blocks per die.

In a clock count method for wore line leak detection as illustrated in FIG. 9, a fixed stress time is applied to all selected die/block/word lines based a leak detection clock value LD_CLK, that can be added in the other programming sub-clocks. In this example, an initial programing clock P_CLK is for the ramp up period, a clock PD_CLK for program pulse duration, then the additional stress time LD_CLK, followed by the verify (or program read) clock PR_CLK when the waveform ramps down. The total stress time is the combined clocks PD_CLK and LD_CLK. The duration of these clocks can be configured by setting the related parameters that can be determined as part of device characterization and stored in storage 266 of system control logic 260.

The word line stress methods illustrated with respect to FIGS. 9 and 10 will apply the same stress time on every die/block; however, determining the stress levels can be delicate. Applying weaker stress values can result in higher yields, but at the cost of more defective parts, such as measure in DPPM. Higher stress values will decrease DPPM values, but at the cost of a yield penalty. Additionally, if the stress levels are too high, this can degrade devices that would otherwise be fine, resulting in worse values for both yield and DPPM. Determining suitable stress conditions under the method illustrated with respect to FIGS. 9 and 10 is consequently a tradeoff between yield and DPPM, with a high yield loss penalty having to be paid in order to achieve a low DPPM specification.

Figure 11:
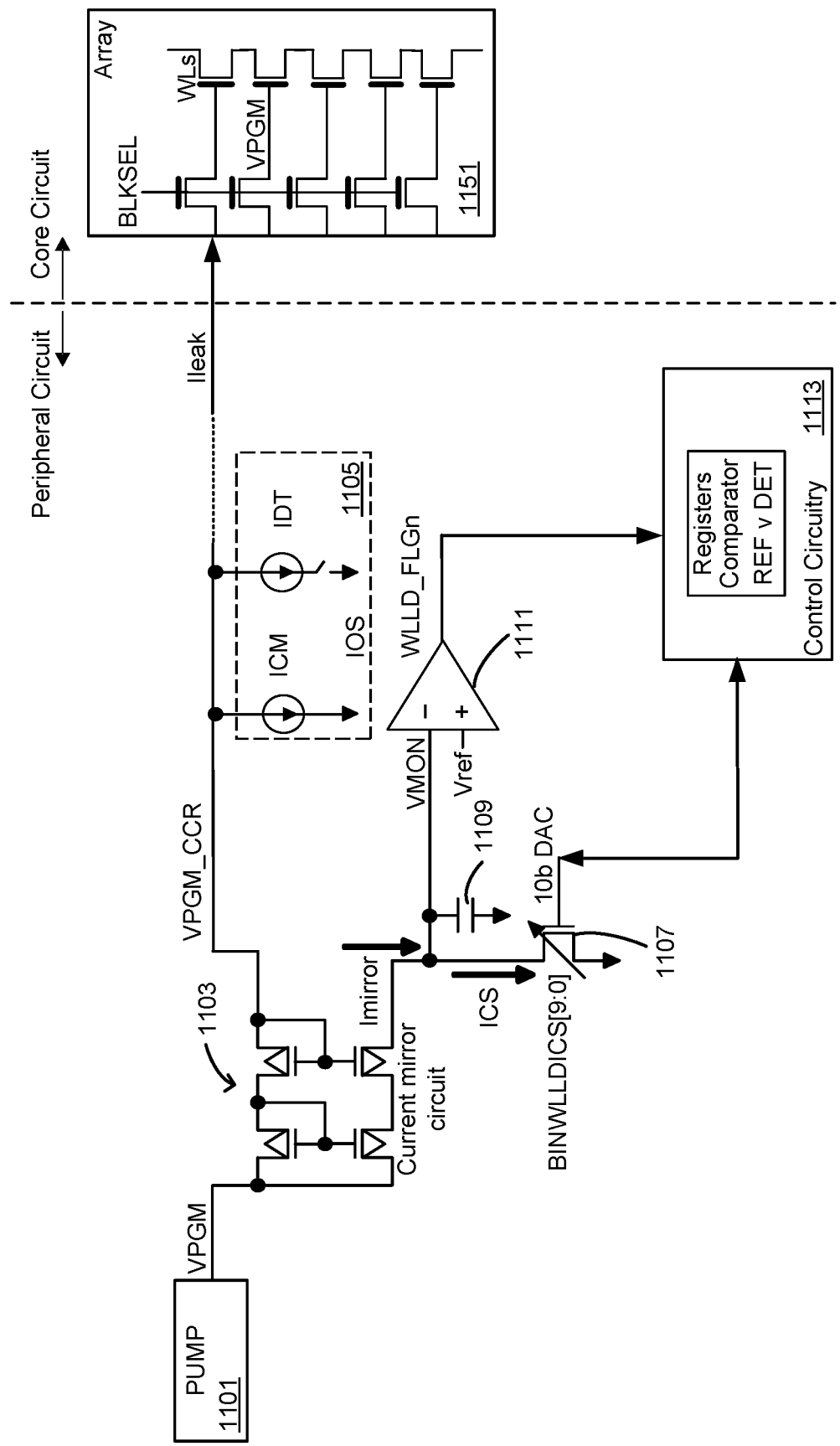
FIGS. 11 and 12 are respectively a schematic representation of a circuit to detect word line leakage and a set of waveforms for the circuit.
Figure 12:
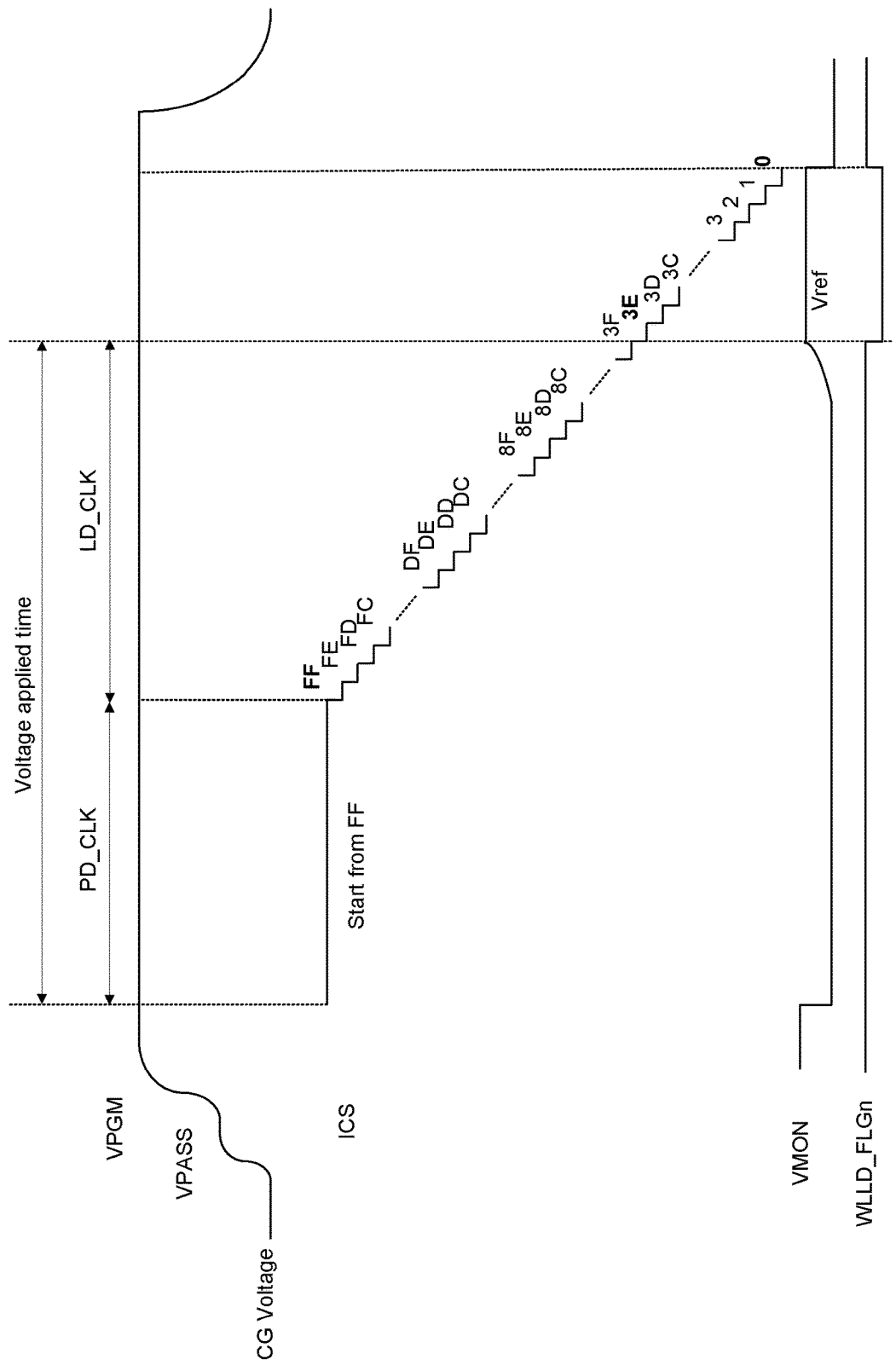

In the following embodiments, circuitry and a corresponding command can provide adaptive word line stress based on a current word line leak detection current mirror mode. Embodiments include the use of leak current as self-adaptive indicator to distinguish between good and bad dies/blocks, using longer stress time for bad blocks and shorter stress time for good blocks. FIGS. 11 and 12 illustrate an example of circuitry and work logic of the use of a current mirror for word line leakage detection.

FIGS. 11 and 12 are respectively embodiments of a schematic representation of a circuit to detect word line leakage and a set of waveforms for the circuit. The elements of FIG. 11 include an array 1151 that is part of the core circuit of the memory, such as part of memory structure 202, and the peripheral circuit, such as control circuit 211 or the control circuit elements of the memory die 200. The array 1151 is represented schematically as a portion of a NAND string whose elements are connected along word lines through block select (BLKSEL) switches to receive voltage levels, such as the program voltage VPGM used during stress as shown on one of the word lines, from the peripheral circuit. (Here the block select switches are shown as part of array 1151, but in other cases for a control die/memory die embodiment as in FIG. 2B they can be part of control die 211.) On the peripheral circuit, a charge pump 1101 can generate VPGM or other stress voltage that can then be applied by way of the decoding circuitry (not shown) to the array 1151. The additional elements shown for the peripheral circuit include elements representing the various contributions to the current and elements to determine whether the array has excessive word line leakage.

To determine word line leakage, VPGM or other stress voltage can be applied to the array 1151 from the charge pump 1101 to the selected word lines for a stress interval as described with respect to FIGS. 7A-10. The leakage current Ileak due to word line leakage from the array or arrays will be one of the sinks drawing off current from the voltage level being generated by charge pump 1101. These other currents are represented in the offset current block IOS 1105, including current sources for a common mode current ICM that will be the amount of current normally drawn in device operation and a detection current IDT that will be used by the device during leak detection by the leak detection circuitry, but that is not part of the word line leakage. For example, the current IDT would include the other peripheral circuit element that are used for leakage detection and only activated during a word line leakage test.

With respect to the elements that are added circuitry to determine Ileak, rather than measure Ileak directly, a current mirror circuit is used to generate a current Imirror that will be proportional to the current due to IOS 1105 and Ileak, but can be of a lower amplitude. For the main leg of the mirror a pair of diode connected transistors (PMOSs in this embodiment) are connected to receive the pump voltage VPGVPGM_CCR to the array. The control gate of each of the diode connected transistors are connected to the control gate of a corresponding transistor in the mirroring leg, which provides the mirrored current Imirror. The relative current amplitudes between the two legs corresponds to the relative sizing of the transistors in the two legs, allowing for a relatively small, but proportional, Imirror value to be used.

The current mirror 1103 supplies the mirror current Imirror to a node that connects to a first input (here the − node) of comparator 1111 at a voltage level VMON, where the other input of comparator 1111 (here +) is connected to receive a reference voltage Vref. A capacitor 1109 that can accumulate the charge supplied from Imirror is also connected to the node of the − input of comparator 1111. Also attached at the node connected to the − input of the comparator 1111 is an adjustable current source BINWLLDICS [9:0] 1107 that drains current off of the upper plate of the capacitor 1109 to ground by the current ICS. In this embodiment, BINWLLDICS[9:0] 1107 is implemented as a 10 bit DAC (digital to analog converter), that is connected to the control circuitry 1113 to receive the 10 bit input that is then applied as a gate voltage to BINWLLDICS[9:0] 1107 to generate the corresponding ICS value. The control circuitry 1113 can be part of the system control logic 260. The control circuitry 1113 also receives the output WLLD_FLGn of comparator 1111 that, as explained in more detail with respect to FIG. 12, acts as a leak detection flag. The control circuitry 1113 will also include registers to hold the parameter values for the leak detection operation and logic circuitry to perform the comparison between detected WLLD_FLGn flag value and reference levels used to determine whether the Ileak value indicates a defective device.

FIG. 12 illustrates some of the waveforms for the circuitry of FIG. 11 in a leak detection process. At top is shown the control gate voltage levels, similarly to that seen in FIG. 10. Relative to FIG. 10, the additional leak detection stress clock time (LD_CLK) and consequent voltage applied time is less that the full time that GC voltage is at VPGM. Below the CG Voltage waveform is the ICS level, the voltage VMON on the first input of the comparator 1111, and the output WLLD_FLGn of the comparator 1111.

During a leak detection mode, the pump 1101 will supply the high stress voltage to the selected word lines of the array 1151. The current drawn, including the leak current Ileak to the array 1151, will be mirrored to the detection module by a current mirror circuit 1103. The ICS value starts high, corresponding to the highest digital value of FF for the current source BINWLLDICS[9:0] 1107, and stays at the high value during the PD_CLK duration. The VMON level is initially high before ICS starts at its high level, but once ICS is on at the FF level VMON is taken low. The output of the comparator 1111 of WLLD_FLGn is initially high. After the initial stress during the PD_CLK phase, in the LD_CLK phase ICS is decreased a step at a time as the digital value of BINWLLDICS[9:0] decreases once leak detection starts. Once ICS drops to less than Imirror, Vmon will start to charge up. After a few more (here about 12) further DAC steps, Vmon will begin to be charged up, eventually becoming larger than Vref, thus making the WLLD_FLGn flip and the control circuitry will record the DAC value which represents the level of Imirror, in turn allowing determination of Ileak.

Under the arrangement of FIGS. 11 and 12, a higher DAC value for when the WLLD_FLGn flips corresponds to a higher Imirror value, and consequently a higher Ileak current. In the arrangement of FIG. 12, the DAC value determining ICS is started from 0xFF, which means a higher leakage current Ileak will take less time for the DAC to drop low enough for comparator to trigger and end the application of the stress voltage. Consequently, the arrangement results in applying less stress on high leakage dies/blocks and more stress on low leakage dies/blocks. This can result in overstressing low leakage blocks, possibly causing otherwise good dies/blocks to fail, and degrading both yield and DPPM values. To address this, FIGS. 13 and 14 present an alternate set of embodiments that can achieve more stress on high leakage dies/blocks and less stress on low leakage dies/blocks.

Figure 13:
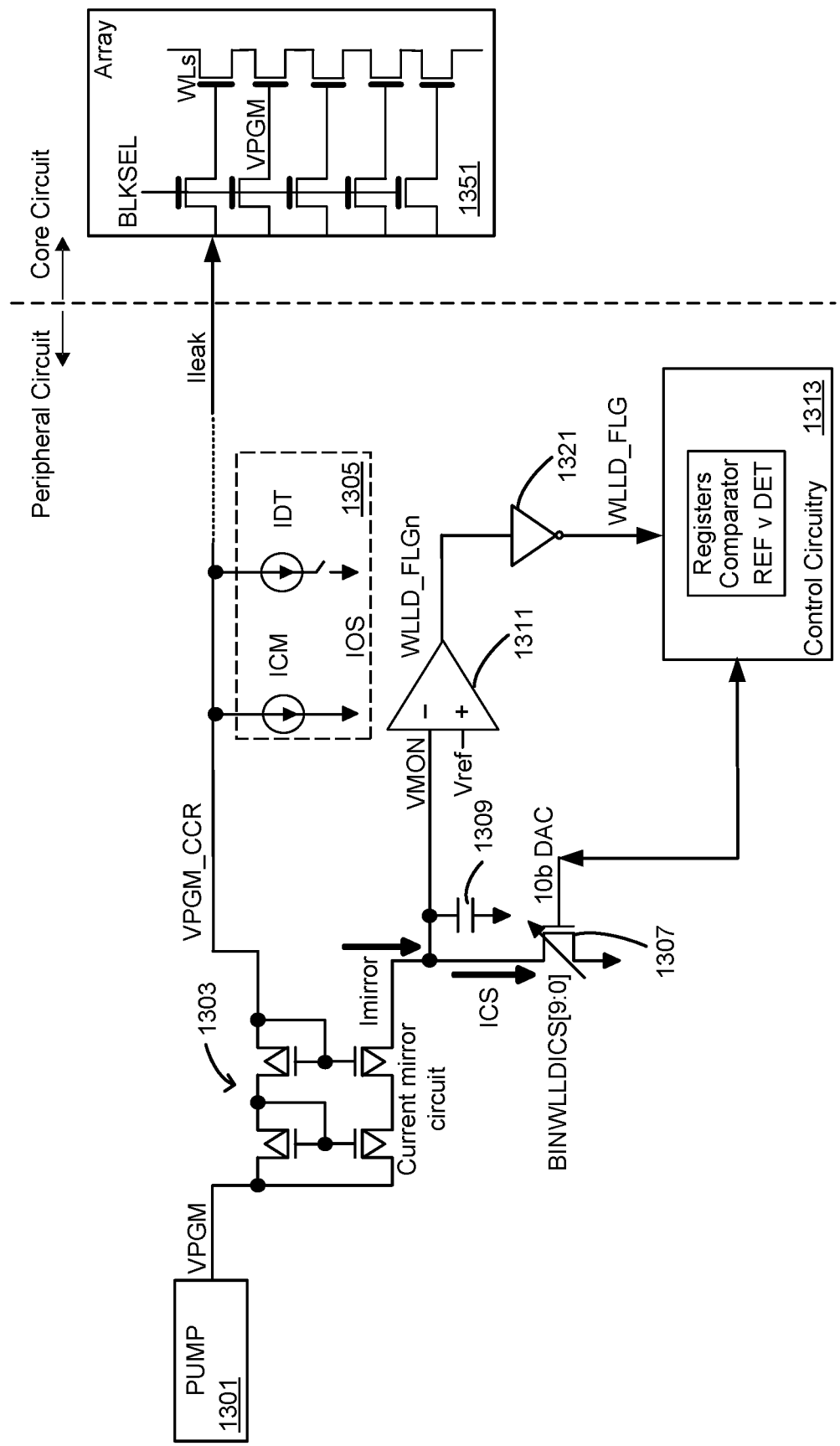
FIGS. 13 and 14 are respectively embodiments of a schematic representation of a self-adaptive stress circuit to detect word line leakage and a set of waveforms for the circuit.
Figure 14:
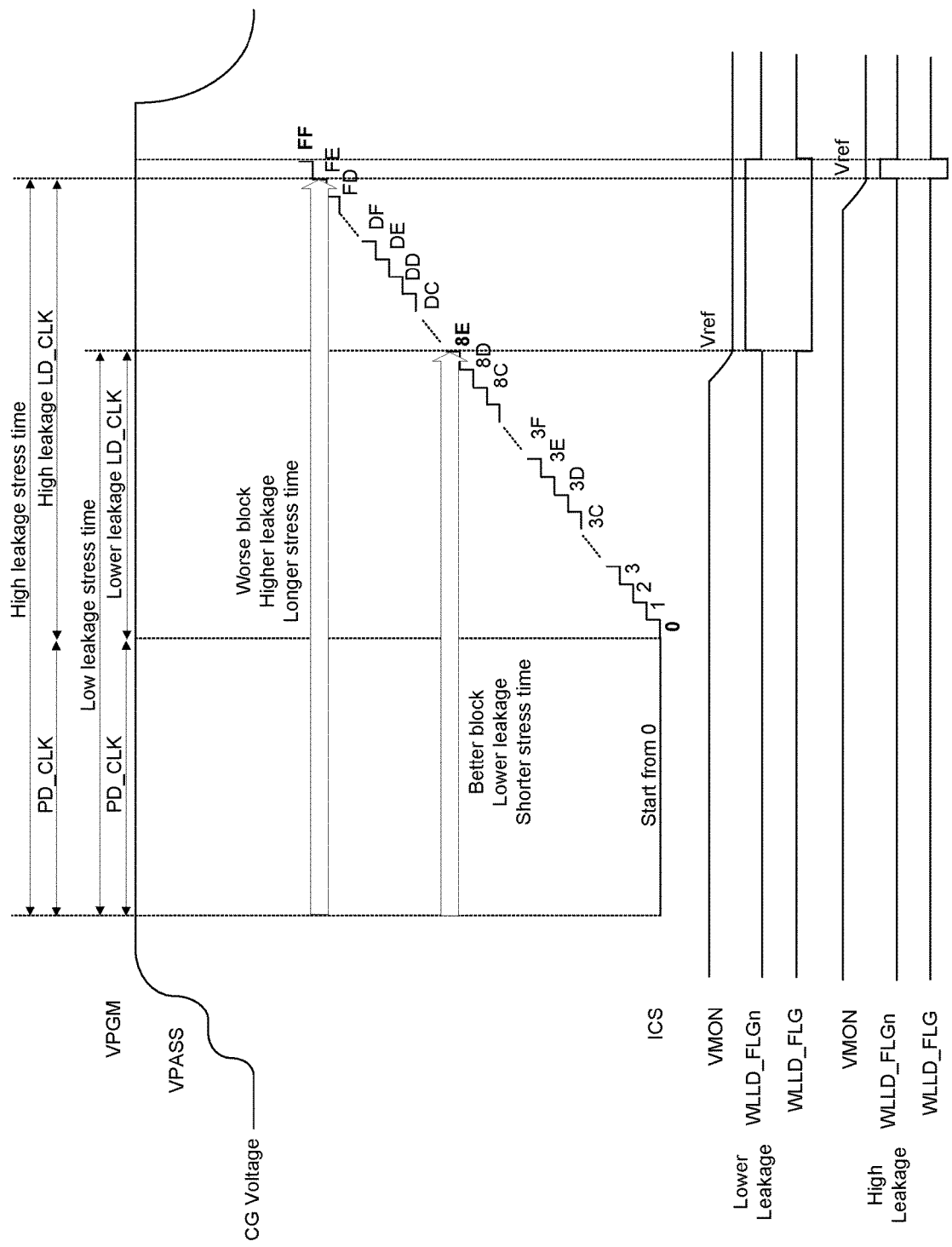

FIGS. 13 and 14 are respectively additional embodiments of a schematic representation of a circuit to detect word line leakage and a set of waveforms for the circuit. The arrangement of FIGS. 13 and 14 can achieve self-adaptive stress, applying lower amounts of stress to low leakage dies/blocks while applying more stress to dies/blocks that have higher leakage.

More specifically, the circuitry of FIG. 13 repeats the elements of FIG. 11, which are similarly numbered (e.g., pump 1101 is now pump 1301 and so on), but with some changes made in its operation. For one, the settable current BINWLLDICS[9:0] 1307 will now start from the low DAC value 0 and increase to FF, rather than the other way around, so that as shown on the waveform in FIG. 14 the ICS level will start from 0 and increase one DAC value at each interval. In addition to the control circuitry 1313 now starting DAC values to BINWLLDICS[9:0] 1307 low, the DAC timing duration can also be increased, as the low leakage case stress will end after few DAC value increments, applying increased stress on leaky dies/blocks to more thoroughly determine if they are likely to fail once in use. The duration of the steps in the DAC values can be based on parameter values stored in the registers of the control circuitry 1313. In addition to the changes in the signals from the control circuitry 1313, the embodiment of FIG. 13 adds an invert 1321 to change the WLLD_FLGn to WLLD_FLG to trigger the word line leaks detection stage's stopping, while being able to use same logic as in the embodiment of FIG. 11.

Figure 15:
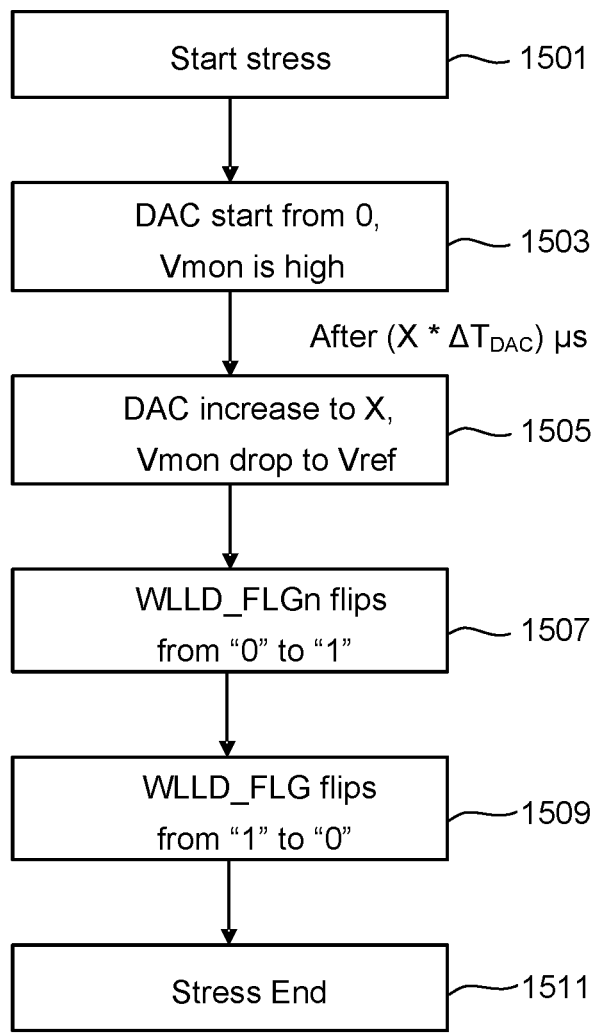
FIG. 15 is flowchart for an embodiment of a stress procedure using adaptive word line stress based on the embodiment of FIGS. 13 and 14.

FIG. 15 is flowchart for an embodiment of a stress procedure using adaptive word line stress based on the embodiment of FIGS. 13 and 14. The stress starts at step 1501, when VPGM is high and applied to a selected word line or word lines. As discussed above, the specifics of the stress voltage and other array biases will depend on the selected test mode (e.g., word line to word line, word line to memory hole, word line to local interconnect, and so on) and the granularity (die, plane, block, sub-block, word line) selected. Initially, ICS is zero, VMON is high, WLLD_FLGn is low, and WLLD_FLG is high. Once the PD_CLK interval lapses, at step 1503 the LD_CLK begins and the ICS DAC value starts to increase. As the DAC value increases, ICS will increase and, once it is bigger than the mirror current Imirror, Vmon will begin to drop.

After X steps, the Vmon level will drop to Vref (which is 0V or other low voltage level in this embodiment) at step 1505. Each step of the increasing DAC value staircase is at the parameter settable value of $\Delta T_{DAC}$ µs, so this will be after $X*\Delta T_{DAC}$ µs. Returning to FIG. 14, this shows a high leakage example and a low leakage example. In the lower leakage case/better block example, at a DAC value of 8E the voltage VMON will drop to Vref. In the worse leakage, better block example VMON will not drop to VMON until a DAC value of FE. Consequently, the longer stress time is applied to the higher leakage block. Once Vmon drops to Vref, at step 1507 the output WLLD_FLGN of comparator 1311 will from "0" to "1" and, at step 1509, the output of the inverter 1321 WLLD_FLG will flip from "1" to "0", thus triggering the stop of the stress at step 1511. As illustrated in FIG. 14, for a block on a die with a higher Ileak value, the resultant Imirror will result in a higher DAC value increase needed to cause WLLD_FLG flip and trigger the stop of the stress after an increased stress time. Consequently, the arrangement of FIGS. 13-15 can achieve longer stress time for high leakage dies/blocks and shorter stress time for low leakage dies/blocks.

In the embodiment of FIGS. 13 and 14 based adaptive word line stress, the stress time is:

$$T_{stress} = T_{PD\_CLK} + [(ICM + IDT + Ileak)/\text{current per } DAC] * \Delta T_{DAC} + T_{Vmon\ discharge}.$$

$T_{PD\_CLK}$ is the duration time of the PD_CLK clock and will correspond to the minimum stress time and can be based on a settable parameter value. Referring back to IOS 1305 of FIG. 13, ICM corresponds the common current drawn by the memory die (or combined memory die control die in the embodiment of FIG. 2B). If ICM is overly large, the die is considered defective and not shipped or the defective blocks can be marked as defective. In the adaptive word line stress approach, if ICM is large it will be stressed longer, even in word line related leakage is low; however, as a large ICM die is defective in other ways, this is not a problem since it suffers from other defects. IDT is the additional current drawn during a detection operation. Ileak is the value that is to be determined in the adaptive word line stress technique: If the selected block has a high leakage current, more stress time will be applied on it to help stress the weak point out and make it easier for screening; and if the block has low leak current, less stress time will be applied on it to avoid overstress on a good block. The current per DAC is the corresponding current value of each DAC step, which can be modulated by selecting a settable parameter. $\Delta T_{DAC}$ is the minimum stress timing duration per DAC value, which can be an additional settable parameter in the adaptive word line stress arrangement. $\Delta T_{DAC}$ is the VMON discharge offset time and is a constant value for a given leak detection circuit.

Figure 16:
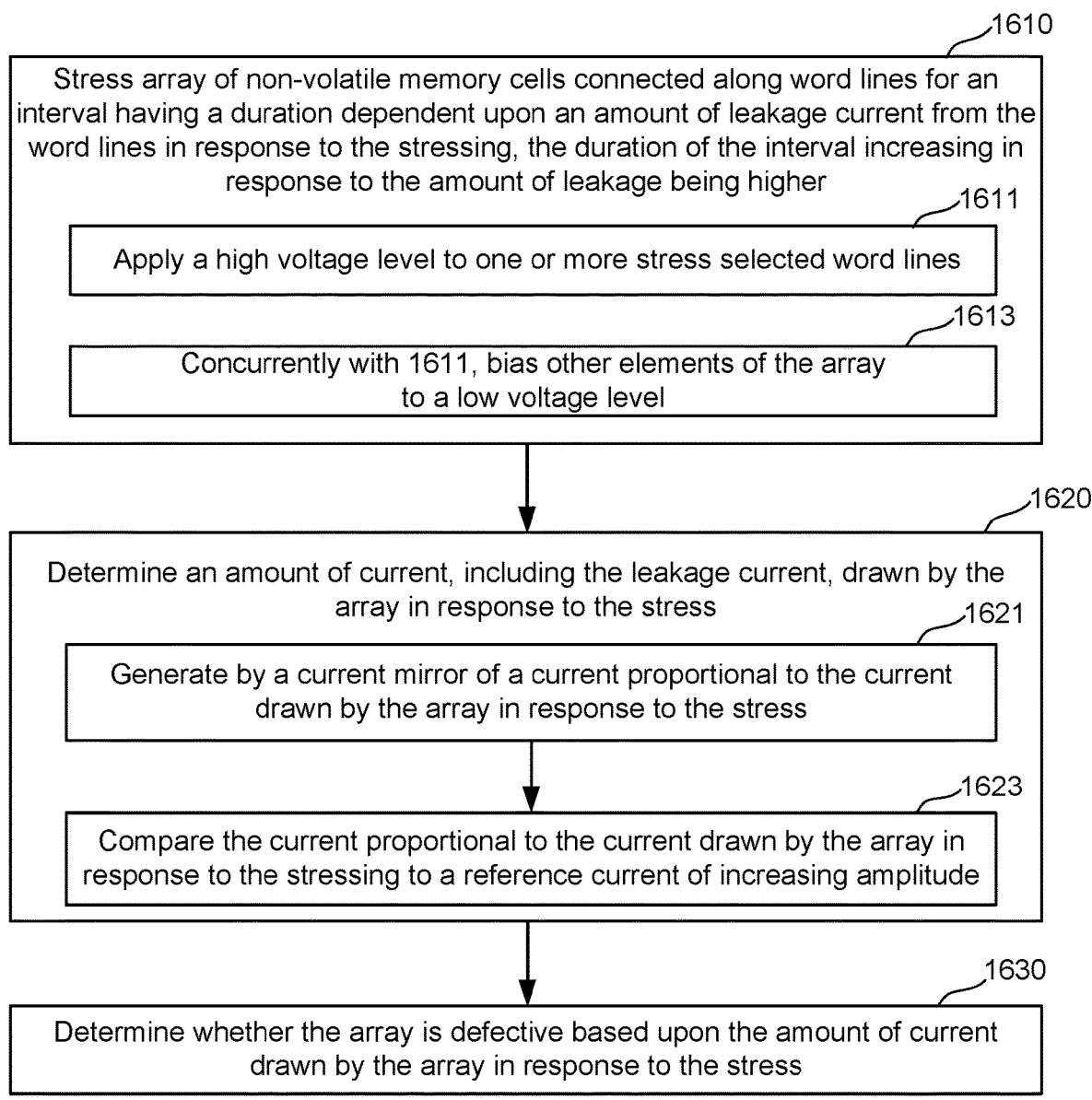
FIG. 16 is a flowchart for an embodiment of adaptive word line stress for leak detection highlighting the adaptive aspects.

FIG. 16 is a flowchart for an embodiment of adaptive word line stress for leak detection highlighting the adaptive aspects. Starting at step 1610, the stress is applied to a memory array, where, as described with respect to FIGS. 13-15, the greater the amount of leakage, the longer the duration of the stress, so that lower leakage device are consequently subjected to less stress. The stress and subsequent defect determination can be performed when the device is tested prior to shipping out or can be incorporated into memory operations once the device is in use, such as the example described with respect to FIG. 8. The stress includes applying the high stress voltage, such as a program voltage, to one or more word lines of one or more blocks at step 1611 and, at the same time, biasing other parts of the array to ground or other low voltage at step 1613. The specifics will depend on the test mode (word line to word line, word line to memory hole, word line to local interconnect, and so on), such as discussed with respect to FIGS. 7A and 7B. The high stress voltage can come from pump 1301 and is applied to the selected word lines by block select switches and other row control circuitry 220. The low voltage level biasing can be performed by the row control circuitry 220 and column control circuitry 210, as controlled by the control circuitry 1313 and other elements of the system control logic 260.

At step 1620, the amount of current, including the leakage current Ileak, drawn by the array in response to the stress is determined. As discussed with respect to FIGS. 13-15, an embodiment for this involves generating by a current mirror 1303 of a current Imirror proportional to the current drawn by the array in response to the stressing at step 1621 and, at step 1623, comparing this mirror current to a reference current ICS of increasing amplitude. In the embodiment of FIG. 13 this is done by charging up the node connected to the − input of comparator 1311 by Imirror while discharging this node by ICS. The resultant voltage VMON is then compared to the reference level of Vref. Once ICS exceeds Imirror, the VMON value will begin to decrease, eventually triggering the word line leakage detection flag. At this point the stress can be stopped.

Step 1630 can then determine whether the array is defective based upon the amount of current drawn by the array in response to the stressing. In the embodiment of FIGS. 13-15, the ICS values is increased based on the digital input value to the current source BINWLLDICS and the determination of whether the array is defective can be determined based on the digital value at which the output flag of comparator 1311 flips, where this determination can be done at various levels of granularity, such as die, block, sub-block, or word line.

Consequently, as described above, the presented embodiments for the word line leakage detection circuits can achieve a self-adaptive stress strategy, which takes into account die-to-die and block-to-block variations. With higher stress times given to dies/blocks with higher leakage, the number parts found to be defective can be reduced. At the same time, with less stress time given to dies/blocks with smaller leakage, the life-time and yield can also be improved. This adaptive strategy will also make it easier to obtain a better trade-off between DPPM and yield in stress development, thus saving on a product's development time.

In view of the foregoing, a first embodiment is a non-volatile memory system, comprising a control circuit configured to connect to one or more arrays each comprising a plurality of non-volatile memory connected along word lines. The control circuit is configured to: concurrently apply a set of stress bias voltages to one or more selected arrays, where to apply the set of stress bias voltages the control circuit is configured to apply a high stress voltage to one or more selected word lines of the one or more selected arrays and bias other elements of the one or more selected arrays to a low voltage level; generate a comparison current having an increasing value as a function of time over a comparison interval; compare, during the comparison interval, a current drawn by the one or more selected arrays in response to the set of stress bias voltages, including a leakage current, with the comparison current; and, based on the comparison, determine whether the one or more selected arrays exhibit excessive leakage.

One embodiment includes a method comprising: stressing an array of non-volatile memory cells connected along word lines for an interval having a duration dependent upon an amount of leakage current from the word lines in response to the stressing, the duration of the interval increasing in response to the amount of leakage being higher and the stressing comprising: applying a high voltage level to one or more stress selected word lines; and concurrently with applying the high voltage level to the stress selected word lines, biasing other elements of the array to a low voltage level. The method further includes: determining an amount of current, including the leakage current, drawn by the array in response to the stressing; and determining whether the array is defective based upon the amount of current drawn by the array in response to the stressing.

One embodiment includes a non-volatile storage system comprising an array of non-volatile memory cells connected along word lines and one or more control circuits connected to the array. The one or more control circuits configured to: stress the array for an interval having a duration dependent upon an amount of leakage current from the word lines in response to the stressing, the duration of the interval increasing in response to the amount of leakage being higher and the stressing comprising, where, to stress the array, the one or more control circuits are configured to: apply a high voltage level to one or more stress selected word lines; and concurrently with applying the high voltage level to the stress selected word lines, bias other elements of the array to a low voltage level; determine an amount of current, including the leakage current, drawn by the array in response to the stressing; and determine whether the array is defective based upon the amount of current drawn by the array in response to the stress.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory system, comprising:
a control circuit configured to connect to one or more arrays each comprising a plurality of non-volatile memory connected along word lines, wherein the control circuit further comprises:
a current mirror configured to generate a mirrored current proportional to the current drawn by the one or more selected arrays in response to the set of stress bias voltages; and
a comparator having a first input node configured to be charged by the mirrored current and discharged by the comparison current and a second node connected to a reference voltage, the control circuit configured to:
concurrently apply a set of stress bias voltages to one or more selected arrays, where to apply the set of stress bias voltages the control circuit is further configured to:
apply a high stress voltage to one or more selected word lines of the one or more selected arrays; and
bias other elements of the one or more selected arrays to a low voltage level;
generate a comparison current having an increasing value as a function of time over a comparison interval;
compare, during the comparison interval, a current drawn by the one or more selected arrays in response to the set of stress bias voltages, including a leakage current, with the comparison current, including:
comparing the mirrored current is compared to the comparison current; and
comparing a voltage level on the first input node of the comparator to the reference voltage; and
based on the comparison, determine whether the one or more selected arrays exhibit excessive leakage.

2. The non-volatile memory system of claim 1, wherein the control circuit is formed on a control die, the non-volatile memory system further comprising:
a memory die including the one or more arrays of memory cells, the memory die separate from and bonded to the control die.

3. The non-volatile memory system of claim 1, wherein, to compare the current drawn by the one or more selected arrays in response to the set of stress bias voltages with the comparison current, the control circuit is configured to determine whether the value of the comparison current is greater than a current derived from the current drawn by the one or more selected arrays; and
in response to the value of the comparison current being greater than the current derived from the current drawn by the one or more selected arrays, discontinuing applying the high stress voltage to the one or more selected word lines.

4. The non-volatile memory system of claim 1, wherein, to generate the comparison current having the increasing value as the function of time over the comparison interval, the control circuit is further configured to generate the comparison current as an analog current value in response to a digital value.

5. The non-volatile memory system of claim 4, wherein the determination of whether the one or more selected arrays exhibit excessive leakage is based on the digital value at which the comparison current exceeds the current drawn by the one or more selected arrays in response to the set of stress bias voltages.

6. The non-volatile memory system of claim 1, wherein, to concurrently apply the set of stress bias voltages to one or more selected arrays, the control circuit is further configured to:
apply the high stress voltage to one or more first word lines of a selected block of memory cells of the one or more selected arrays; and
bias one or more second word lines of the selected block to the low voltage level, one or more of the first word lines being adjacent to one of the second word lines.

7. The non-volatile memory system of claim 1, wherein:
the one or more arrays are of a 3D NAND architecture in which NAND strings run vertically between source lines and bit lines; and
to concurrently apply the set of stress bias voltages to one or more selected arrays, the control circuit is further configured to:
apply the high stress voltage to one or more selected word lines of one or more blocks of the one or more selected arrays; and
bias one or more source lines and one or more bit lines of each of the one or blocks to the low voltage level.

8. The non-volatile memory system of claim 1, wherein:
the one or more arrays are of a 3D NAND architecture in which NAND strings run vertically above source lines connected by local interconnects to supply lines formed above the NAND strings; and
to concurrently apply the set of stress bias voltages to one or more selected arrays, the control circuit is further configured to:
apply the high stress voltage to one or more selected word lines of one or more blocks of the one or more selected arrays; and
bias one or more local interconnects of each of the one or blocks to the low voltage level.

9. The non-volatile memory system of claim 1, wherein the one or more arrays are part of a memory die and each comprises a plurality of blocks of a NAND architecture, and wherein the set of stress bias voltages are concurrently applied to a plurality of selected blocks of the die and the determination of whether the one or more selected arrays exhibit excessive leakage is performed at a level of the die.

10. The non-volatile memory system of claim 1, wherein the one or more arrays each comprises a plurality of blocks of a NAND architecture, and wherein the set of stress bias voltages are concurrently applied to one or more selected blocks and the determination of whether the one or more selected arrays exhibit excessive leakage is performed at a level of individual blocks.

11. The non-volatile memory system of claim 1, wherein the determination of whether the one or more selected arrays exhibit excessive leakage is performed at a level of individual word lines.

12. A method, comprising:
stressing an array of non-volatile memory cells connected along word lines for an interval having a duration dependent upon an amount of leakage current from the word lines in response to the stressing, the duration of the interval increasing in response to the amount of leakage being higher and the stressing comprising:
applying a high voltage level to one or more stress selected word lines; and concurrently with applying the high voltage level to the stress selected word lines, biasing other elements of the array to a low voltage level;

determining an amount of current, including the leakage current, drawn by the array in response to the stressing; and determining whether the array is defective based upon the amount of current drawn by the array in response to the stressing, including:

generating by a current mirror of a current proportional to the current drawn by the array in response to the stressing; and comparing the current proportional to the current drawn by the array in response to the stressing to a reference current of increasing amplitude comprising:

concurrently charging a node of a comparison circuit by the current proportional to the current drawn by the array in response to the stressing while discharging the node by the reference current of increasing amplitude.

13. The method of claim 12, wherein the reference current of increasing amplitude is increased in response to a digital input and determining whether the array is defective is based on a value of the digital input when a voltage level on the node of the comparison circuit dropping below a reference voltage.

14. The method of claim 12, wherein concurrently applying the set of stress bias voltages to one or more selected arrays comprises:

applying the high stress voltage to one or more first word lines of a selected block of memory cells of the one or more selected arrays; and biasing one or more second word lines of the selected block to the low voltage level, one or more of the first word lines being adjacent to one of the second word lines.

15. The method of claim 12, wherein the array is of a 3D NAND architecture in which NAND strings run vertically between source lines and bit lines, and wherein concurrently applying the set of stress bias voltages to one or more selected arrays comprises:

applying the high stress voltage to one or more selected word lines of one or more blocks of the one or more selected arrays; and biasing one or more source lines and one or more bit lines of each of the one or blocks to the low voltage level.

16. The method of claim 12, wherein the array is of a 3D NAND architecture in which NAND strings run vertically above source lines connected by local interconnects to supply lines formed above the NAND strings, and wherein concurrently applying the set of stress bias voltages to one or more selected arrays comprises:

applying the high stress voltage to one or more selected word lines of one or more blocks of the one or more selected arrays; and biasing one or more local interconnects of each of the one or blocks to the low voltage level.

17. A non-volatile memory system, comprising:

an array of non-volatile memory cells connected along word lines; and one or more control circuits comprising a current mirror and connected to the array, the one or more control circuits configured to:

stress the array for an interval having a duration dependent upon an amount of leakage current from the word lines in response to the stressing, the duration of the interval increasing in response to the amount of leakage being higher and the stressing comprising, where, to stress the array, the one or more control circuits are configured to:

apply a high voltage level to one or more stress selected word lines; and concurrently with applying the high voltage level to the stress selected word lines, bias other elements of the array to a low voltage level;

determine an amount of current, including the leakage current, drawn by the array in response to the stressing, including generating by the current mirror of a current proportional to the current drawn by the array in response to the stress; and comparing the current proportional to the current drawn by the array in response to the stress to a reference current of increasing amplitude, including:

concurrently charging a node of a comparison circuit by the current proportional to the current drawn by the array in response to the stress and discharge the node by the reference current of increasing amplitude.

18. The non-volatile memory system of claim 17, wherein, to concurrently apply the set of stress bias voltages to one or more selected arrays, the one or more control circuits are further configured to:

apply the high stress voltage to one or more first word lines of a selected block of memory cells of the one or more selected arrays; and bias one or more second word lines of the selected block to the low voltage level, one or more of the first word lines being adjacent to one of the second word lines.

19. The non-volatile memory system of claim 17, wherein:

the array is of a 3D NAND architecture in which NAND strings run vertically between source lines and bit lines; and to concurrently apply the set of stress bias voltages to one or more selected arrays, the one or more control circuits are further configured to:

apply the high stress voltage to one or more selected word lines of one or more blocks of the one or more selected arrays; and bias one or more source lines and one or more bit lines of each of the one or blocks to the low voltage level.

20. The non-volatile memory system of claim 17, wherein:

the array is of a 3D NAND architecture in which NAND strings run vertically above source lines connected by local interconnects to supply lines formed above the NAND strings; and to concurrently apply the set of stress bias voltages to one or more selected arrays, the one or more control circuits are further configured to:

apply the high stress voltage to one or more selected word lines of one or more blocks of the one or more selected arrays; and bias one or more local interconnects of each of the one or blocks to the low voltage level.

* * * * *